(12) United States Patent
Sakuma et al.

(10) Patent No.: US 11,296,566 B2
(45) Date of Patent: Apr. 5, 2022

(54) ROTATING ELECTRIC MACHINE

(71) Applicant: AISIN CORPORATION, Kariya (JP)

(72) Inventors: Masafumi Sakuma, Kariya (JP);
Masako Shibamori, Kariya (JP)

(73) Assignee: AISIN CORPORATION, Kariya (JP)

( * ) Notice: Subject to any disclaimer, the term of this patent is extended or adjusted under 35 U.S.C. 154(b) by 174 days.

(21) Appl. No.: 16/783,278

(22) Filed: Feb. 6, 2020

(65) Prior Publication Data

US 2020/0259382 A1    Aug. 13, 2020

(30) Foreign Application Priority Data

Feb. 12, 2019    (JP) .............................. JP2019-022513

(51) Int. Cl.
| | |
|---|---|
| *H02K 3/12* | (2006.01) |
| *H02K 3/28* | (2006.01) |
| *H02K 1/16* | (2006.01) |
| *H02K 1/27* | (2006.01) |
| *H02K 3/48* | (2006.01) |
| *H02K 3/50* | (2006.01) |
| *H02K 1/276* | (2022.01) |

(52) U.S. Cl.
CPC .............. *H02K 3/12* (2013.01); *H02K 1/165* (2013.01); *H02K 1/276* (2013.01); *H02K 3/28* (2013.01); *H02K 3/48* (2013.01); *H02K 3/50* (2013.01); *H02K 2213/03* (2013.01)

(58) Field of Classification Search
CPC .. H02K 3/28; H02K 3/12; H02K 3/48; H02K 1/165; H02K 3/50; H02K 1/276; H02K 2213/03

USPC .................................................. 310/216.095
See application file for complete search history.

(56) References Cited

U.S. PATENT DOCUMENTS

| 9,871,417 B2 | 1/2018 | Saito et al. |
| 9,923,426 B2 | 3/2018 | Ito |
| 10,056,794 B2 | 8/2018 | Saito et al. |

(Continued)

FOREIGN PATENT DOCUMENTS

| JP | 2013150437 A | 8/2013 |
| JP | 2016140202 A | 8/2016 |

(Continued)

OTHER PUBLICATIONS

Moriyasu, Shoji, Practical Electrical Machinery, Morikita Publishing Co., Ltd., Jul. 25, 2000, 1$^{st}$ edition, pp. 70-73 (discussed in specification).

*Primary Examiner* — Alex W Mok
(74) *Attorney, Agent, or Firm* — Buchanan Ingersoll & Rooney PC

(57) ABSTRACT

A rotating electric machine includes: a stator having slots in which coils formed of conductive wires are stored; and a rotor facing the stator and having magnetic poles. The rotating electric machine has a fraction slot configuration or an integer slot configuration. The coils configure a mixed phase band group in which a first, second and third basic phase band groups are stacked in this order in a radial direction of the slots. In the mixed phase band group, a magnitude of magnetomotive force of each phase per pole is uniform, and, when the number of layers of the first, second and third basic phase band groups in the radial direction are denoted by m1, m2 and m3, respectively a relationship of $0 < 2 \times m2/(m1+m3)$ is satisfied.

5 Claims, 22 Drawing Sheets

(56) References Cited

U.S. PATENT DOCUMENTS

| | | | | |
|---|---|---|---|---|
| 2013/0113330 | A1* | 5/2013 | Saito | H02K 21/14 |
| | | | | 310/207 |
| 2017/0353071 | A1* | 12/2017 | Saito | B60L 50/51 |
| 2018/0102678 | A1* | 4/2018 | Kusase | H02K 1/14 |
| 2018/0358857 | A1 | 12/2018 | Sakuma et al. | |
| 2019/0115795 | A1 | 4/2019 | Sakuma et al. | |
| 2019/0267855 | A1 | 8/2019 | Sakuma et al. | |

FOREIGN PATENT DOCUMENTS

| | | | |
|---|---|---|---|
| JP | 2018074663 | A | 5/2018 |
| JP | 2019004537 | A | 1/2019 |
| JP | 2019075879 | A | 5/2019 |

* cited by examiner

FIG.10

| Nspp | m1-m2-m3 | PHASE CONFIGURATION | CONCENTRIC WINDING CONFIGURATION |
|---|---|---|---|
| 1.5 | 2-2-2 | (phase diagram) | 1/2 & 5/6-1/6 |
|  | 2-4-2 | (phase diagram) | 1/2 & 7/8-1/8 |
|  | 2-6-2 | (phase diagram) | 1/2 & 9/10-1/10 |
|  | 2-8-2 | (phase diagram) | 1/2 & 11/12-1/12 |

FIG.11

| Nspp | m1-m2-m3 | PHASE CONFIGURATION | CONCENTRIC WINDING CONFIGURATION |
|---|---|---|---|
| 2.5 | 2-2-2 | (phase configuration diagram) | 1-1/2 & 5/6-1/6 |
| | 2-4-2 | (phase configuration diagram) | 1-1/2 & 7/8-1/8 |
| | 2-6-2 | (phase configuration diagram) | 1-1/2 & 9/10-1/10 |
| | 2-8-2 | (phase configuration diagram) | 1-1/2 & 11/12-1/12 |

FIG.12

| Nspp | m1-m2-m3 | PHASE CONFIGURATION | CONCENTRIC WINDING CONFIGURATION |
|---|---|---|---|
| 3.5 | 2-2-2 | 0 1 2 3 4 ... 11 12 13 14 15 ... 21 22 23 24 25<br>U U U U     U U U      U U U U<br>U U U       U U U U       U U U<br>U U U       U U U U       U U U<br>U U U U     U U U         U U U U<br>U U U U     U U U         U U U U<br>U U U       U U U U       U U U | 1-1/2 & 1-5/6-1/6 |
| | 2-4-2 | U U U U     U U U         U U U U<br>U U U       U U U U       U U U<br>U U U       U U U U       U U U<br>U U U U     U U U         U U U U<br>U U U       U U U U       U U U<br>U U U U     U U U         U U U U<br>U U U U     U U U         U U U U<br>U U U       U U U U       U U U | 1-1/2 & 1-7/8-1/8 |
| | 2-6-2 | U U U U     U U U         U U U U<br>U U U       U U U U       U U U<br>U U U       U U U U       U U U<br>U U U U     U U U         U U U U<br>U U U       U U U U       U U U<br>U U U U     U U U         U U U U<br>U U U       U U U U       U U U<br>U U U U     U U U         U U U U<br>U U U U     U U U         U U U U<br>U U U       U U U U       U U U | 1-1/2 & 1-9/10-1/10 |
| | 2-8-2 | U U U U     U U U         U U U U<br>U U U       U U U U       U U U<br>U U U       U U U U       U U U<br>U U U U     U U U         U U U U<br>U U U       U U U U       U U U<br>U U U U     U U U         U U U U<br>U U U       U U U U       U U U<br>U U U U     U U U         U U U U<br>U U U       U U U U       U U U<br>U U U U     U U U         U U U U<br>U U U U     U U U         U U U U<br>U U U       U U U U       U U U | 1-1/2 & 1-11/12-1/12 |

FIG.13

| Nspp | m1-m2-m3 | PHASE CONFIGURATION | | | CONCENTRIC WINDING CONFIGURATION |
|---|---|---|---|---|---|
| 4.5 | 2-2-2 | 0 1 2 3 4 5<br>U U U U<br>　U U U U<br>U U U U<br>U U U U U<br>U U U U U<br>U U U U | 14 15 16 17 18 19<br>　U U U U<br>U U U U U<br>U U U U U<br>　U U U U<br>U U U U<br>U U U U U | 27 28 29 30 31 32<br>U U U U U<br>　U U U U<br>U U U U<br>U U U U U<br>U U U U U<br>U U U U | 1-1-1/2<br>&1-5/6-1/6 |
| | 2-4-2 | U U U U U<br>　U U U U<br>U U U U<br>U U U U U<br>U U U U<br>U U U U U<br>U U U U U<br>U U U U | U U U U<br>U U U U U<br>U U U U U<br>　U U U U<br>U U U U U<br>　U U U U<br>U U U U<br>U U U U U | U U U U U<br>U U U U<br>U U U U<br>U U U U U<br>U U U U<br>U U U U U<br>U U U U U<br>U U U U | 1-1-1/2<br>&1-7/8-1/8 |
| | 2-6-2 | U U U U U<br>　U U U U<br>U U U U<br>U U U U U<br>U U U U<br>U U U U U<br>U U U U<br>U U U U U<br>U U U U U<br>U U U U | U U U U<br>U U U U U<br>U U U U U<br>　U U U U<br>U U U U U<br>　U U U U<br>U U U U U<br>　U U U U<br>U U U U<br>U U U U U | U U U U U<br>　U U U U<br>U U U U<br>U U U U U<br>U U U U<br>U U U U U<br>U U U U<br>U U U U U<br>U U U U U<br>U U U U | 1-1-1/2<br>&1-9/10-1/10 |
| | 2-8-2 | U U U U U<br>　U U U U<br>U U U U<br>U U U U U<br>U U U U<br>U U U U U<br>U U U U<br>U U U U U<br>U U U U<br>U U U U U<br>U U U U U<br>U U U U | U U U U<br>U U U U U<br>U U U U U<br>　U U U U<br>U U U U U<br>　U U U U<br>U U U U U<br>　U U U U<br>U U U U U<br>　U U U U<br>U U U U<br>U U U U U | U U U U U<br>　U U U U<br>U U U U<br>U U U U U<br>U U U U<br>U U U U U<br>U U U U<br>U U U U U<br>U U U U<br>U U U U U<br>U U U U U<br>U U U U | 1-1-1/2<br>&1-11/12-1/12 |

FIG.14

| Nspp | m1-m2-m3 | PHASE CONFIGURATION | CONCENTRIC WINDING CONFIGURATION |
|---|---|---|---|
| 1 | 1-1-1 | 1 2 3 4 5 6 7 8 9<br>U . . U . . U . .<br>. U . . U . . U .<br>. . U . . U . . U | 1/3 & 1/3-1/3 |
|  | 1-2-1 | U . . U . . U . .<br>. U . . U . . U .<br>. U . . U . . U .<br>. . U . . U . . U | 1/4 & 2/4-1/4 |
|  | 1-3-1 | U . . U . . U . .<br>. U . . U . . U .<br>. U . . U . . U .<br>. U . . U . . U .<br>. . U . . U . . U | 1/5 & 3/5-1/5 |
|  | 1-4-1 | U . . U . . U . .<br>. U . . U . . U .<br>. U . . U . . U .<br>. U . . U . . U .<br>. U . . U . . U .<br>. . U . . U . . U | 1/6 & 4/6-1/6 |

FIG.15

| Nspp | m1-m2-m3 | PHASE CONFIGURATION | CONCENTRIC WINDING CONFIGURATION |
|---|---|---|---|
| 2 | 1-1-1 | 1 2 3 4 . . 7 8 9 10 . . 13 14 15 16<br>U U . . . . U U . . . . U U . .<br>. U U . . . . U U . . . . U U .<br>. . U U . . . . U U . . . . U U | 2/3-1/3 & 2/3-1/3 |
|  | 1-2-1 | U U . . . . U U . . . . U U . .<br>. U U . . . . U U . . . . U U .<br>. U U . . . . U U . . . . U U .<br>. . U U . . . . U U . . . . U U | 3/4-1/4 & 3/4-1/4 |
|  | 1-3-1 | U U . . . . U U . . . . U U . .<br>. U U . . . . U U . . . . U U .<br>. U U . . . . U U . . . . U U .<br>. U U . . . . U U . . . . U U .<br>. . U U . . . . U U . . . . U U | 4/5-1/5 & 4/5-1/5 |
|  | 1-4-1 | U U . . . . U U . . . . U U . .<br>. U U . . . . U U . . . . U U .<br>. U U . . . . U U . . . . U U .<br>. U U . . . . U U . . . . U U .<br>. U U . . . . U U . . . . U U .<br>. . U U . . . . U U . . . . U U | 5/6-1/6 & 5/6-1/6 |

FIG.16

| Nspp | m1-m2-m3 | PHASE CONFIGURATION | CONCENTRIC WINDING CONFIGURATION |
|---|---|---|---|
| 3 | 1-1-1 | 1 2 3 4 5 … 10 11 12 13 14 … 20 21 22 23 24<br>U U\|U  U U\|U  U U\|U<br>U\|U U  U\|U U  U\|U U<br>\|U U U  \|U U U  \|U U U | 2/3-1/3 & 1-2/3-1/3 |
| | 1-2-1 | U U\|U  U U\|U  U U\|U<br>U\|U U  U\|U U  U\|U U<br>U\|U U  U\|U U  U\|U U<br>\|U U U  \|U U U  \|U U U | 3/4-1/4 & 1-3/4-1/4 |
| | 1-3-1 | U U\|U  U U\|U  U U\|U<br>U\|U U  U\|U U  U\|U U<br>U\|U U  U\|U U  U\|U U<br>U\|U U  U\|U U  U\|U U<br>\|U U U  \|U U U  \|U U U | 4/5-1/5 & 1-4/5-1/5 |
| | 1-4-1 | U U\|U  U U\|U  U U\|U<br>U\|U U  U\|U U  U\|U U<br>U\|U U  U\|U U  U\|U U<br>U\|U U  U\|U U  U\|U U<br>U\|U U  U\|U U  U\|U U<br>\|U U U  \|U U U  \|U U U | 5/6-1/6 & 1-5/6-1/6 |

FIG.17

| Nspp | m1-m2-m3 | PHASE CONFIGURATION | CONCENTRIC WINDING CONFIGURATION |
|---|---|---|---|
| 4 | 1-1-1 | 1 2 3 4 5 6 … 13 14 15 16 17 18 … 25 26 27 28 29 30<br>U U U\|U  U U U\|U  U U U\|U<br>U U\|U U  U U\|U U  U U\|U U<br>U\|U U U  U\|U U U  U\|U U U | 1-2/3-1/3 & 1-2/3-1/3 |
| | 1-2-1 | U U U\|U  U U U\|U  U U U\|U<br>U U\|U U  U U\|U U  U U\|U U<br>U U\|U U  U U\|U U  U U\|U U<br>U\|U U U  U\|U U U  U\|U U U | 1-3/4-1/4 & 1-3/4-1/4 |
| | 1-3-1 | U U U\|U  U U U\|U  U U U\|U<br>U U\|U U  U U\|U U  U U\|U U<br>U U\|U U  U U\|U U  U U\|U U<br>U U\|U U  U U\|U U  U U\|U U<br>U\|U U U  U\|U U U  U\|U U U | 1-4/5-1/5 & 1-4/5-1/5 |
| | 1-4-1 | U U U\|U  U U U\|U  U U U\|U<br>U U\|U U  U U\|U U  U U\|U U<br>U U\|U U  U U\|U U  U U\|U U<br>U U\|U U  U U\|U U  U U\|U U<br>U U\|U U  U U\|U U  U U\|U U<br>U\|U U U  U\|U U U  U\|U U U | 1-5/6-1/6 & 1-5/6-1/6 |

ROTATING ELECTRIC MACHINE

CROSS REFERENCE TO RELATED APPLICATIONS

This application is based on and claims priority under 35 U.S.C. § 119 to Japanese Patent Application 2019-022513, filed on Feb. 12, 2019, the entire contents of which are incorporated herein by reference.

TECHNICAL FIELD

This disclosure relates to a rotating electric machine including a stator having a plurality of slots storing coils formed of conductive wires, and a rotor facing the stator and having a plurality of magnetic poles.

BACKGROUND DISCUSSION

JP 2013-150437A (Reference 1) discloses a rotating electric machine having an integer slot configuration in which a simple fraction (number of slots per pole per phase) obtained by dividing the number of slots of a stator by the number of phases and the number of magnetic poles of a rotor is a natural number. In the rotating electric machine, a plurality of layers are provided in a slot inward from the outside in a radial direction, and, in slot conductors with the same phase, second and third layers are deviated relative to a first layer by one slot, and a fourth layer is deviated relative to the second and third layers by one slot, so that a set of slot conductor groups is formed (refer to FIG. 12). A plurality of slot conductors of the slot conductor groups are stored in a predetermined number Ns of slots adjacent to each in a circumferential direction, and, when the number of slots per pole per phase is denoted by NSPP, and the number of layers is denoted by 2×NL, Ns is set to NSPP+NL. With this configuration, the invention disclosed in Reference 1 is directed to reducing noise of the rotating electric machine.

JP 2016-140202A (Reference 2) discloses a rotating electric machine including fraction slots in which the number of slots per pole per phase is a fraction. Windings are disposed to overlap each other in three layers with respect to one slot, and, in a first-layer winding, respective windings of three phases such as a U phase, a V phase, and a W phase are disposed to be rotationally symmetric to each other at ±120 degrees in terms of mechanical angle. A second-layer winding is disposed to be deviated relative to the disposition of the first-layer winding by L slots. A third-layer winding is disposed to be deviated relative to the disposition of the first-layer winding by L slots in a reverse direction to the direction in which the second-layer winding is deviated. With this configuration, the invention disclosed in Reference 2 is directed to reducing a torque ripple of a three-phase AC electric motor.

"Practical Electric Machinery" written by Shoji MORI-YASU (Morikita Publishing Co., Ltd., issued Jul. 25, 2000 (first edition, first print), page 72) (Reference 3) discloses a technique in which, when a slot harmonic voltage is required to be removed, in a case of a fraction slot configuration in which the number of slots per pole per phase is a fraction, a slot is formed to be inclined by 1/c of a slot pitch (where c is a denominator of a simple fraction of the number of slots per pole per phase).

However, the invention disclosed in Reference 1 cannot be applied to a rotating electric machine with a fraction slot configuration in which the number of slots per pole per phase is not a natural number. Specifically, in the rotating electric machine with the fraction slot configuration, the predetermined number Ns is not a natural number, and thus disposition of a plurality of slot conductors cannot be defined. Since the number of layers is defined as 2×NL, an even number of layers is assumed, and thus the invention cannot be applied to a rotating electric machine having an integer slot configuration in which an odd number of layers are formed.

The invention disclosed in Reference 2 is the invention directed to reducing a torque ripple, and an effect of reducing noise and vibration of a three-phase AC electric motor is restricted. In other words, noise and vibration caused by a torque ripple can be reduced, but noise and vibration caused by other factors cannot be reduced. Specifically, in the three-phase AC electric motor disclosed in Reference 2, the magnitude of magnetomotive force generated by windings with the same phase and the same current direction, stored in two slots adjacent to each other in the circumferential direction changes at a ratio of 4:3:3:4 in the circumferential direction, and this is repeated. Thus, even though the windings in the three layers are deviated by predetermined slots in the circumferential direction, the magnetomotive force generated due to winding conduction is not uniform per pole. As a result, excitation force in a spatial deformation mode in a lower order than the number of magnetic poles of the rotor is easily generated. An eigenfrequency of the stator in the low-order spatial deformation mode is reduced, and thus a resonance frequency of the stator in the rotating electric machine is reduced. When the resonance frequency is reduced, a rotation frequency range of the rotating electric machine generating excitation force at a frequency matching the resonance frequency increases, and thus a rotation range in which noise and vibration are problematic spreads. Since an operation range of a rotating electric machine for use in an electric car and a hybrid car covers the whole regions of torque and a rotation frequency, the use of such a rotating electric machine causes an increase in an operation frequency at which noise and vibration increase.

As disclosed in Reference 3, in the rotating electric machine with the fraction slot configuration, a torque ripple (including cogging torque) can be reduced by a skew corresponding to 1/c of a slot pitch, but it is difficult to reduce noise and vibration of the rotating electric machine. Specifically, in the rotating electric machine with the fraction slot configuration, in an electromagnetic attraction force distribution generated between a stator and a rotor, an equivalent of each pole collapses, and thus excitation force in a spatial deformation mode in an order obtained by dividing the number of magnetic poles of the rotor by c is generated. In other words, in the rotating electric machine with the fraction slot configuration, excitation force in a lower-order spatial deformation mode is easily generated than in a rotating electric machine with an integer slot configuration (c=1) when the number of magnetic poles of a rotor is the same. As a result, noise and vibration increase in a rotation frequency region in which an eigenfrequency of a stator corresponding to a low-order spatial deformation mode matches a frequency of excitation force in the low-order spatial deformation mode.

Thus, a need exists for a rotating electric machine which is not susceptible to the drawback mentioned above.

SUMMARY

A feature of a rotating electric machine according to an aspect of the present disclosure resides in that the rotating electric machine includes a stator having a plurality of slots in which coils formed of conductive wires are stored; and a rotor facing the stator and having a plurality of magnetic poles, in which the rotating electric machine has a fraction slot configuration in which the number of slots per pole per phase obtained by dividing the number of slots of the stator by the number of phases and the number of the magnetic poles of the rotor has a denominator of 2 in simple fraction expression or an integer slot configuration in which the number of slots per pole per phase is a natural number, in which when a set of coil sides of the coils stored in one or the plurality of adjacent slots with the same phase and the same current direction for each of the magnetic poles of the rotor is referred to as a basic phase band, the coils configure a mixed phase band group in which a first basic phase band group obtained by disposing each basic phase band per pole, a second basic phase band group obtained by deviating the first basic phase band group by a predetermined number of slots in a rotational direction of the rotor, and a third basic phase band group obtained by deviating the second basic phase band group in the rotational direction by the predetermined number of slots are stacked in this order in a radial direction of the slots, and in which, in the mixed phase band group, a magnitude of magnetomotive force of each phase per pole is uniform, and, when the number of layers of the first basic phase band group in the radial direction is denoted by m1, the number of layers of the second basic phase band group in the radial direction is denoted by m2, and the number of layers of the third basic phase band group in the radial direction is denoted by m3, a relationship of $0 < 2 \times m2/(m1+m3)$ is satisfied. Here, the predetermined number of slots may be an integer closest to the number of slots per pole obtained by multiplying the number of slots per pole per phase by the number of phases in a case of the fraction slot configuration, and may be 1 in a case of the integer slot configuration.

BRIEF DESCRIPTION OF THE DRAWINGS

The foregoing and additional features and characteristics of this disclosure will become more apparent from the following detailed description considered with the reference to the accompanying drawings, wherein:

FIG. 10 is a list schematic diagram illustrating U phase disposition of a rotating electric machine in which Nspp is 1.5;

FIG. 11 is a list schematic diagram illustrating U phase disposition of a rotating electric machine in which Nspp is 2.5;

FIG. 12 is a list schematic diagram illustrating U phase disposition of a rotating electric machine in which Nspp is 3.5;

FIG. 13 is a list schematic diagram illustrating U phase disposition of a rotating electric machine in which Nspp is 4.5;

FIG. 14 is a list schematic diagram illustrating U phase disposition of a rotating electric machine in which Nspp is 1;

FIG. 15 is a list schematic diagram illustrating U phase disposition of a rotating electric machine in which Nspp is 2;

FIG. 16 is a list schematic diagram illustrating U phase disposition of a rotating electric machine in which Nspp is 3;

FIG. 17 is a list schematic diagram illustrating U phase disposition of a rotating electric machine in which Nspp is 4;

DETAILED DESCRIPTION

Hereinafter, a description will be made of embodiments of a rotating electric machine according to the embodiment disclosed here with reference to the drawings. In the present embodiment, a three-phase AC synchronous electric motor (hereinafter, referred to as a motor M) will be described as an example of a rotating electric machine. However, various modifications may occur within the scope without departing from the concept of the embodiment without limitation to the following embodiment.

Fundamental Configuration

Figure 1:
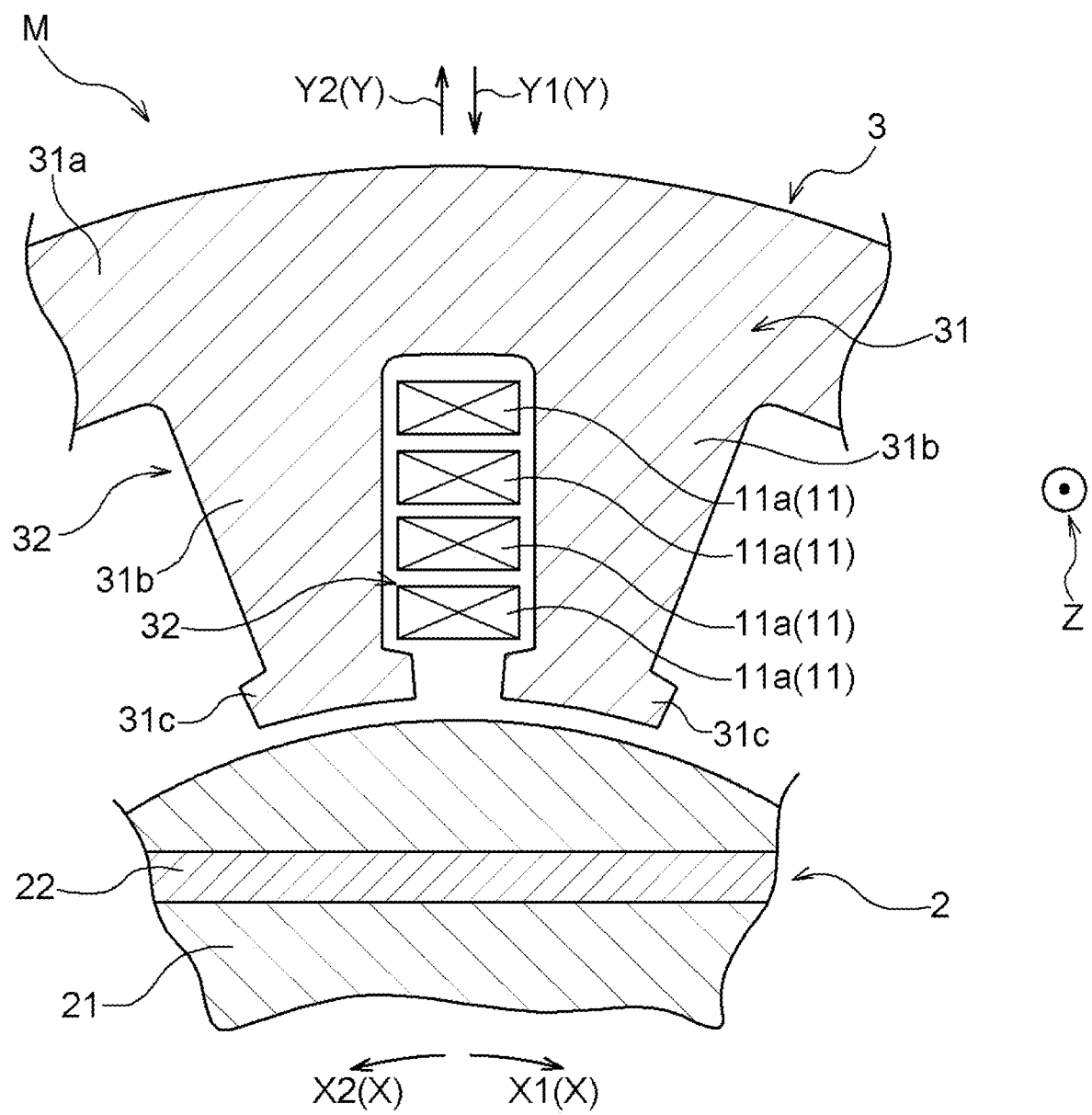
FIG. 1 is a partially enlarged sectional view of a rotating electric machine.

As illustrated in FIG. 1, the motor M includes a stator 3 having a plurality of slots 32 in which coil sides 11a of a plurality of unit coils 11 (an example of a coil) formed of conductive wires (hereinafter, referred to as windings) are stored, and a rotor 2 facing the stator 3 and having a plurality of permanent magnets 22 (an example of a magnetic pole). In the following description, a rotational direction or a reversely rotational direction of the rotor 2 will be referred to as a circumferential direction X, a radial direction of the rotor 2 will be referred to as a radial direction Y, and a direction parallel to a rotation axis of the rotor 2 is an axial direction Z (orthogonal direction). In the circumferential direction X, a direction in which the rotor 2 rotates will be referred to as a rotational direction X1, and a direction reverse thereto will be referred to as a reversely rotational direction X2. In the radial direction Y, a direction from the stator 3 toward the rotor 2 (a direction toward an opening side of the slot 32) will be referred to as an inner radial direction Y1, and a direction from the rotor 2 toward the stator 3 will be referred to as an outer radial direction Y2 (a direction toward a bottom side of the slot 32).

The stator 3 has a tubular stator core 31, and the stator core 31 is formed by laminating a plurality of magnetic steel sheets. The stator core 31 includes a yoke portion 31a formed annularly on the outer radial direction Y2 side, a plurality of teeth portions 31b protruding in the inner radial direction Y1 from the yoke portion 31a, and flange portions 31c disposed in the circumferential direction X at protruding ends of the plurality of teeth portions 31b. The slot 32 storing the coil sides 11a of the unit coils 11 formed of windings is formed between the adjacent teeth portions 31b, and a plurality of slots 32 are provided by the same number as the number of the plurality of teeth portions 31b.

The rotor 2 includes a tubular rotor core 21 formed by laminating a plurality of magnetic steel sheets, and a plurality of permanent magnets 22 buried in the rotor core 21. The rotor core 21 is supported at a shaft member (not illustrated), and the rotor 2 is configured to relatively rotatable in the rotational direction X1 with respect to the stator 3. The permanent magnet 22 is formed of a rare-earth magnet or the like, in which N poles and S poles are alternately disposed in the circumferential direction X. Outer circumferential surfaces of the plurality of permanent magnets 22 may be exposed from the rotor core 21.

The motor M of the present embodiment has 1 or greater as a value (hereinafter, referred to as a number of slots per pole per phase or the Nspp) obtained by dividing the number of slots 32 of the stator 3 by the number of phases (three phases in the present embodiment) and the number of magnetic poles of the rotor 2, and has a fraction slot configuration in which a denominator is 2 when the number of slots per pole per phase is expressed by a simple fraction or an integer slot configuration in which the number of slots per pole per phase is a natural number. Hereinafter, when the number of slots per pole per phase is expressed by a simple mixed fraction, for example, a+b/c (where a is an integer part, and b/c (where b<c, and b and c are integers) is a simple fraction part), and c is assumed to be 1 in a case of an integer slot configuration. For example, in the motor M having eight poles and sixty slots, the number of slots per pole per phase is 5/2 (a=2, b=1, and c=2), and, in the motor M having eight poles and forty-eight slots, the number of slots per pole per phase is 2 (a=2, b=0, and c=1).

Windings wound on the plurality of slots 32 are formed of conductive wires in which, for example, copper wires are coated with insulator layers. As the winding, a round wire having a circular section or various conductive wires having polygonal sections may be used. As a winding method for the winding on the slot 32, generally, a two-layer winding, a concentric winding, or a wave winding is used.

Figure 2:
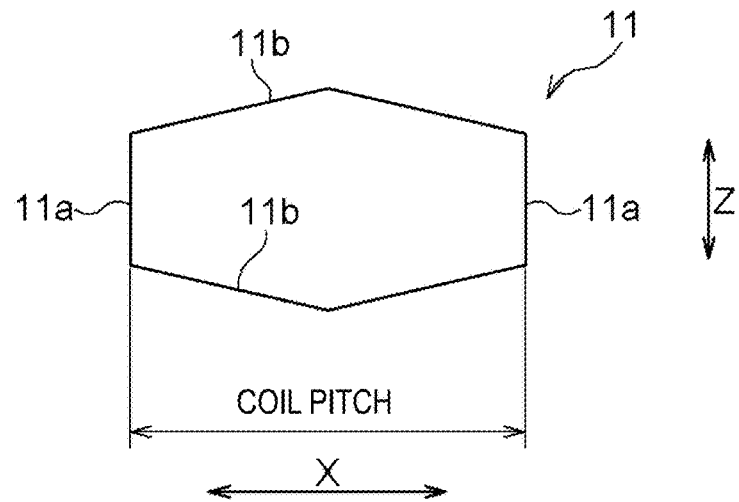
FIG. 2 is a schematic diagram illustrating a configuration example of a unit coil.

FIG. 2 illustrates the unit coil 11 having a two-layer winding or a concentric winding as a winding method for the winding on the slot 32. The unit coil 11 is typically formed of a winding that is wound a plurality of times, but this is indicated by a single line segment for convenience. The unit coil 11 has a pair of coil sides 11a and 11a along the axial direction Z, and a pair of coil ends 11b and 11b along the circumferential direction X. The pair of coil sides 11a and 11a are parts stored in the slot 32, and the pair of coil ends 11b and 11b are disposed on both end surfaces of the teeth portions 31b in the axial direction Z and are electrically connected to the pair of coil sides 11a and 11a.

As illustrated in FIG. 1, each of the coils with the respective phases (the U phase, the V phase, and the W phase) is formed by laminating a plurality of unit coils 11 in the slot 32 along the radial direction Y. In a case of a fraction slot configuration, a fraction slot has a plurality of sets of two-layer units each formed of coil sides 11a of the two-layer unit coils 11 in which two unit coils 11 are laminated (for example, in FIG. 4, four sets such as a first layer and a second layer, a third layer and a fourth layer, a fifth layer and a sixth layer, and a seventh layer and an eighth layer). In a case of an integer slot configuration, an integer slot has a plurality of layers of coil sides 11a of the unit coils 11 in which a single unit coil 11 is laminated (for example, in FIG. 9, four layers such as a first layer, a second layer, a third layer, and a fourth layer). Regarding a coil with each phase in the present embodiment, a plurality of unit coils 11 are laminated in the radial direction Y, and are stored in the slot 32. The coils with the three phases are electrically connected to each other through a Y connection. The coils with the three phases may be electrically connected to each other through a Δ connection, and are not particularly limited.

In a case of a two-layer winding in the fraction slot configuration, a coil pitch is an integer closest to the number of slots per pole obtained by dividing the number of slots 32 of the stator 3 by the number of magnetic poles of the rotor 2. For example, in a case of the motor M having eight poles and sixty slots (the number of slots per pole is 7.5), the coil pitch is seven slots (short-pitch winding) or eight slots (long-pitch winding).

Figure 3:
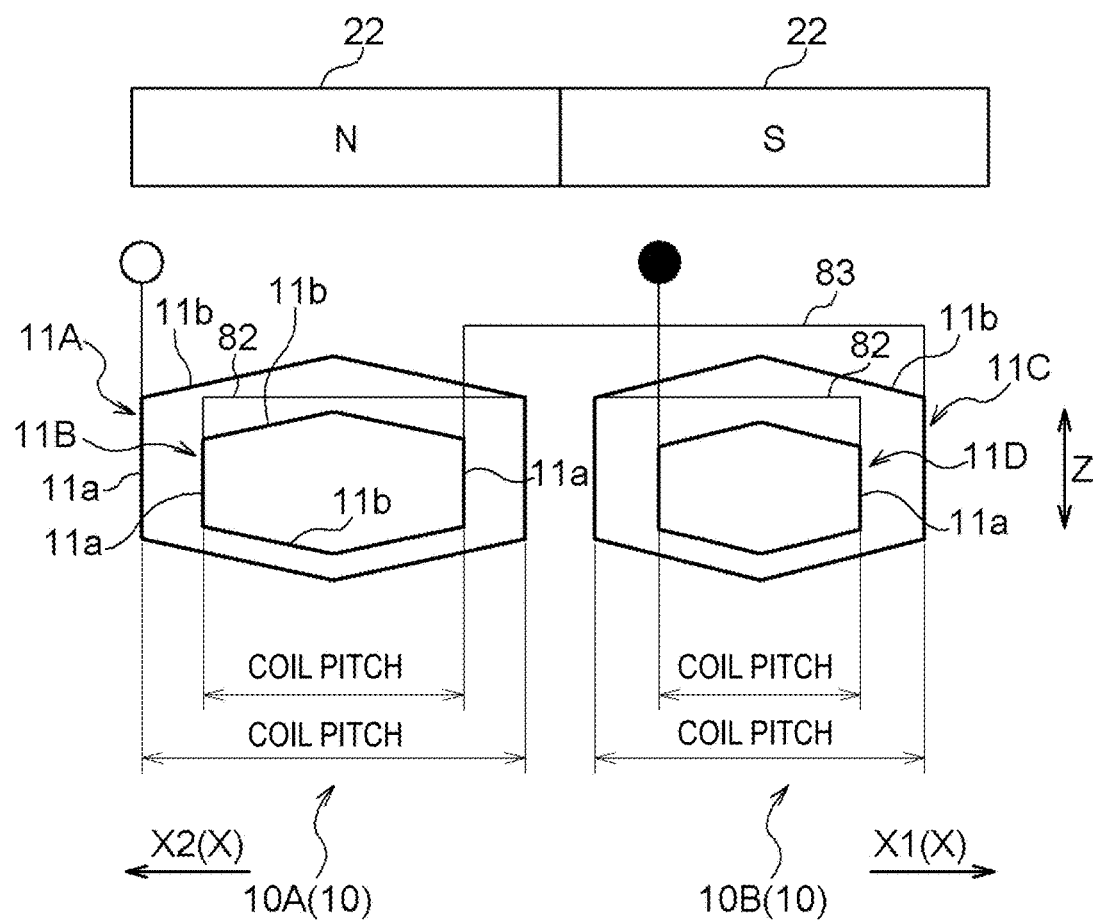
FIG. 3 is a conceptual diagram illustrating a concentric winding.

FIG. 3 illustrates a concentric winding as an example of a winding method for a winding on the slot 32. A plurality of pole pair coils 10 respectively facing the magnetic poles of the rotor 2 include a first pole coil 10A and a second pole coil 10B, and the first pole coil 10A and the second pole coil 10B are electrically connected in series to each other. In FIG.

3, a white circle indicates a winding starting end, and a black circle indicates a winding termination.

In the present embodiment, the first pole coil 10A includes a plurality of (two) unit coils such as a first unit coil 11A and a second unit coil 11B having different coil pitches between the pair of coil sides 11a and 11a. For example, in a case of eight poles and sixty slots (Nspp=2.5, m1=1, m2=2, and m3=1), a coil pitch between the pair of coil sides 11a and 11a of the first unit coil 11A is set to seven slots, and a coil pitch between the pair of coil sides 11a and 11a of the second unit coil 11B is set to five slots (refer to FIGS. 5 and 6). Here, m1 denotes the number of two-layer units (one set) having the first layer and the second layer as one set in the radial direction Y, m2 denotes the number of two-layer units (two sets) having the third layer and the four layer, and the fifth layer and the sixth layer as two sets in the radial direction Y, and m3 denotes the number of two-layer units (one set) having the seventh layer and the eighth layer as one set in the radial direction Y. The first unit coil 11A and the second unit coil 11B are concentrically wound, and are electrically connected in series to each other via an inter-unit coil connection portion 82 so as to form the first pole coil 10A.

The second pole coil 10B includes a plurality of (two) unit coils such as a third unit coil 11C and a fourth unit coil 11D having different coil pitches between the pair of coil sides 11a and 11a. In a case of eight poles and sixty slots (Nspp=2.5), a coil pitch between the pair of coil sides 11a and 11a of the third unit coil 11C is set to six slots, and a coil pitch between the pair of coil sides 11a and 11a of the fourth unit coil 11D is set to four slots (refer to FIGS. 5 and 6). The third unit coil 11C and the fourth unit coil 11D are concentrically wound, and are electrically connected in series to each other via an inter-unit coil connection portion 82 so as to form the second pole coil 10B.

The first pole coil 10A and the second pole coil 10B respectively correspond to a pair of magnetic poles (two poles) adjacent to each other among a plurality of magnetic poles (eight poles in a case of eight poles and sixty slots). The first pole coil 10A and the second pole coil 10B are electrically connected in series to each other via an inter-coil connection portion 83. The first unit coil 11A, the second unit coil 11B, the third unit coil 11C, and the fourth unit coil 11D have different coil pitches between the pair of coil sides 11a and 11a, and are all set to seven slots (short-pitch winding) or less of a two-layer winding coil pitch. Therefore, in a concentric winding, a conductor length can be made shorter than in a two-layer winding, and thus a conductor amount used in the stator 3 can be reduced.

Noise and Vibration of Motor M Due to Phase Disposition of Stator 3

FIGS. 5 and 6, and FIGS. 8 and 9 illustrate examples of magnetic pole facing states between phase disposition of windings wound on the plurality of slots 32 and a pair of magnetic poles (an N pole and an S pole) of the rotor 2 according to the present embodiment. In the figures, the yoke portion 31a, the teeth portion 31b, and the windings are not illustrated, and series numbers on the upper end in the figures indicate slot numbers of the respective slots 32. The coil with the U phase, the coil with the V phase, and the coil with the W phase are deviated in this order by a phase of 120° in terms of electrical angle. Hereinafter, the respective phases (the U phase, the V phase, and the W phase) have the same phase disposition except for phase deviation, and thus the coil with the U phase will be described as a representative. In the figures, the expressions "U" and "U̲" denote the coil sides 11a in which current directions are reverse to each other, and the same expressions ("U" or "U̲") denote the coil sides 11a in which current directions are the same as each other. The coil sides 11a are sequentially referred to as a first, a second layer, . . . , from the coil side 11a located in the outermost radial direction Y2 toward the coil side 11a in the inner radial direction Y1.

A set of the coil sides 11a with the same phase and the same current direction per magnetic pole of the rotor 2 and stored in one or a plurality of slots 32 adjacent to each other is defined as a basic phase band 5. Here, the "set of the coil sides 11a with the same phase and the same current direction and stored in one or a plurality of slots 32 adjacent to each other" means a set of the coil sides 11a with the same phase and the same current direction per magnetic pole and stored in a single slot 32 or a plurality of slots 32 adjacent to each other consecutively in the circumferential direction X.

In a fraction slot configuration of eight poles and sixty slots (Nspp=5/2, a=2, b=1, and c=2), as illustrated in FIGS. 4 to 8, the basic phase band 5 includes a first pole basic phase band 5A and a second pole basic phase band 5B respectively facing a pair of magnetic poles (two poles) adjacent to each other among a plurality of magnetic poles (eight poles in a case of eight poles and sixty slots). The first pole basic phase band 5A and the second pole basic phase band 5B have different phase dispositions and are the basic phase bands 5 having mutual phase differences.

Figure 7:
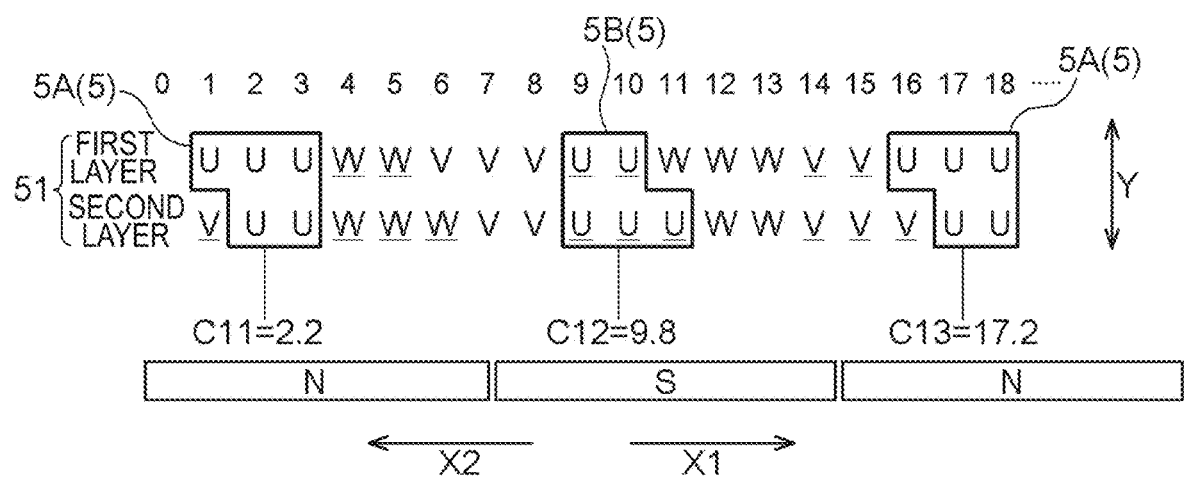
FIG. 7 is a schematic diagram illustrating an example of phase disposition of eight poles and sixty slots in a comparison example.

As a comparison example, in a fraction slot configuration of eight poles and sixty slots (Nspp=5/2, a=2, b=1, and c=2), in a case of the basic type motor M formed of only the first layer and the second layer illustrated in FIG. 7, a plurality of (five) coil sides 11a of the basic phase band 5 disposed in the No. 1 slot to No. 3 slot are one in the No. 1 slot, two in the No. 2 slot, and two in the No. 3 slot. Thus, the center C11 of the plurality of coil sides 11a of the basic phase band 5 is 2.2 as shown in the following Equation (1).

$$C11=(1\times1+2\times2+3\times2)/(1+2+2)=2.2 \quad (1)$$

Similarly, the center C12 of a plurality of (five) coil sides 11a of the basic phase band 5 disposed in the No. 9 slot to the No. 11 slot is 9.8 as shown in the following Equation (2), and the center C13 of a plurality of (five) coil sides 11a of the basic phase band 5 disposed in the No. 16 slot to the No. 18 slot is 17.2 as shown in the following Equation (3).

$$C12=(9\times2+10\times2+11\times1)/(2+2+1)=9.8 \quad (2)$$

$$C13=(16\times1+17\times2+18\times2)/(1+2+2)=17.2 \quad (3)$$

From the calculation result, a distance between the centers in the coil sides 11a of the basic phase band 5 of the U phase in the comparative example is C12−C11=7.6, and C13−C12=7.4, and 7.6 and 7.4 are alternately repeated. In other words, a distance between the centers in the coil sides 11a of the basic phase bands 5 of the same phase, adjacent to each other in the circumferential direction X, is not uniform per pole. Thus, a pair of magnetic poles adjacent to each other in the circumferential direction X have different attraction force distributions, and thus an attraction force distribution applied to a plurality of teeth portions 31b is not equivalent every magnetic pole, and is equivalent every pair of magnetic poles (every two magnetic poles), that is, every other pole. The two types of attraction force distributions have excitation force components in a lower order (the spatial deformation mode fourth order in the present embodiment) than an order (the spatial deformation mode eighth order in the present embodiment) depending on the number of magnetic poles (eight poles in the present embodiment) of the rotor 2 with respect to the stator 3. As a result, excitation force in a spatial deformation mode in a lower order than the number of magnetic poles of the rotor 2 is easily generated, and thus noise and vibration increase in a rotation frequency region in which an eigenfrequency of the stator 3 corresponding to the low-order spatial deformation mode matches a frequency of excitation force in the low-order spatial deformation mode.

In the comparison example, the number of a plurality of coil sides 11a forming the basic phase band 5 of the U phase is uniform (five) per pole, and thus the magnitude of magnetomotive force generated when the winding of the stator 3 is conducted is uniform per pole. However, as described above, the ½-sequence (where c=2) motor M has two types of magnetomotive force distributions. Therefore, in the present embodiment, even though the magnitude of magnetomotive force is uniform, noise and vibration of the motor M due to phase disposition of windings of the stator 3 are reduced by improving a state (a state of not being rotationally symmetric) in which a magnetomotive force distribution is not uniform.

Therefore, as illustrated in FIGS. 5 and 6, and FIGS. 8 and 9, in the present embodiment, a mixed phase band group 50 is provided in which a first basic phase band group 51 as an aggregate in which each of a plurality of basic phase bands 5 is disposed per pole, a second basic phase band group 52 obtained by deviating the first basic phase band group 51 by a predetermined number of slots in the rotational direction X1 of the rotor 2, and a third basic phase band group 53 obtained by deviating the second basic phase band group 52 in the rotational direction X1 by a predetermined number of slots are stacked in this order from the outer radial direction Y2 of the slots 32 in the inner radial direction Y1. The predetermined number of slots is an integer (3×Nspp±1/c) closest to a value (the number of slots per pole) obtained by multiplying the number of slots per pole per phase by three (multiplying by the number of phases) in a case of a fraction slot configuration, and is one corresponding to ±1/c (where c is 1 or −1) in a case of an integer slot configuration. Hereinafter, in the mixed phase band group 50, a mixture of the basic phase bands 5 per pole will be referred to as a mixed phase band 50A. The number of the coil sides 11a when a plurality of coil sides 11a forming the mixed phase band 50A are electrically connected in series to each other will be referred to as the number of series-connected windings Nt (=M×(a×c+b), where M=m1+m2+m3). Here, m1 denotes the number of layers of the first basic phase band group 51 in the radial direction Y, m2 denotes the number of layers of the second basic phase band group 52 in the radial direction Y, and m3 denotes the number of layers of the third basic phase band group 53 in the radial direction Y.

Figure 4:
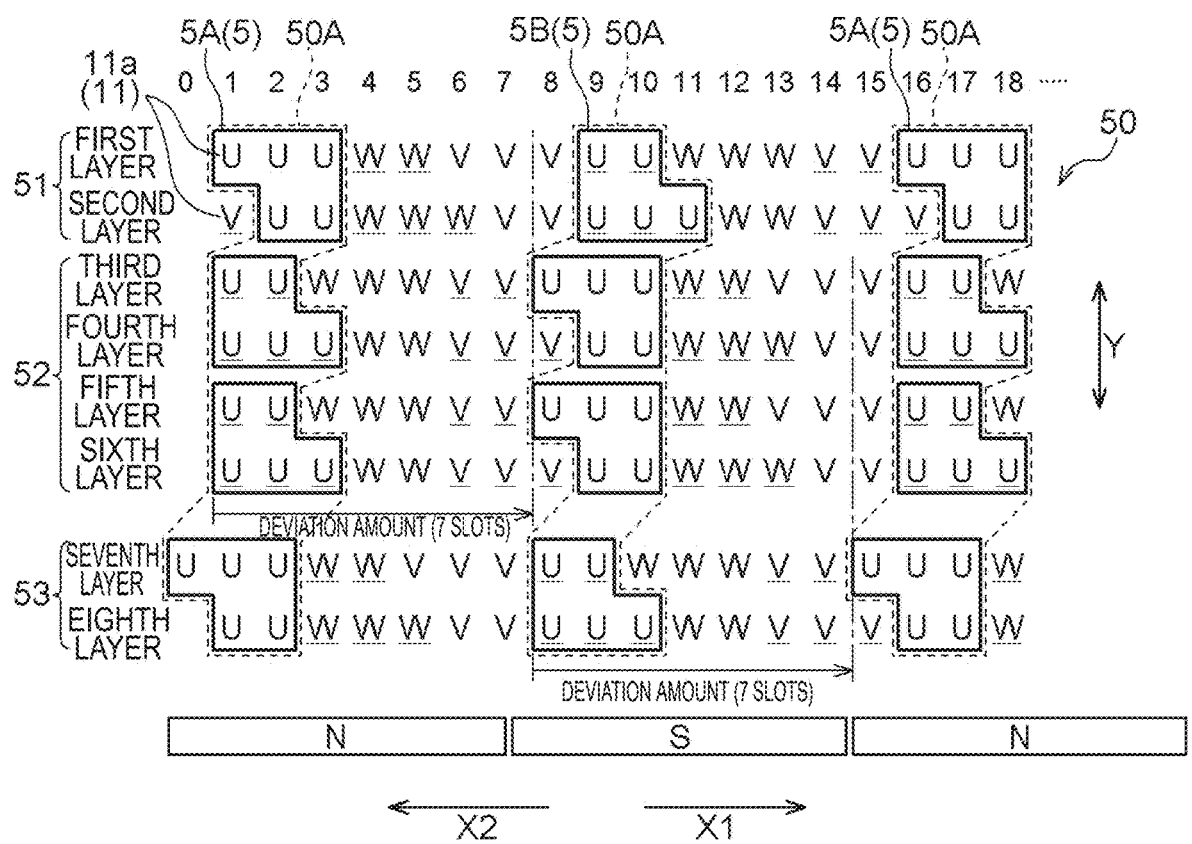
FIG. 4 is a schematic diagram illustrating an example of phase disposition of eight poles and sixty slots.
Figure 5:
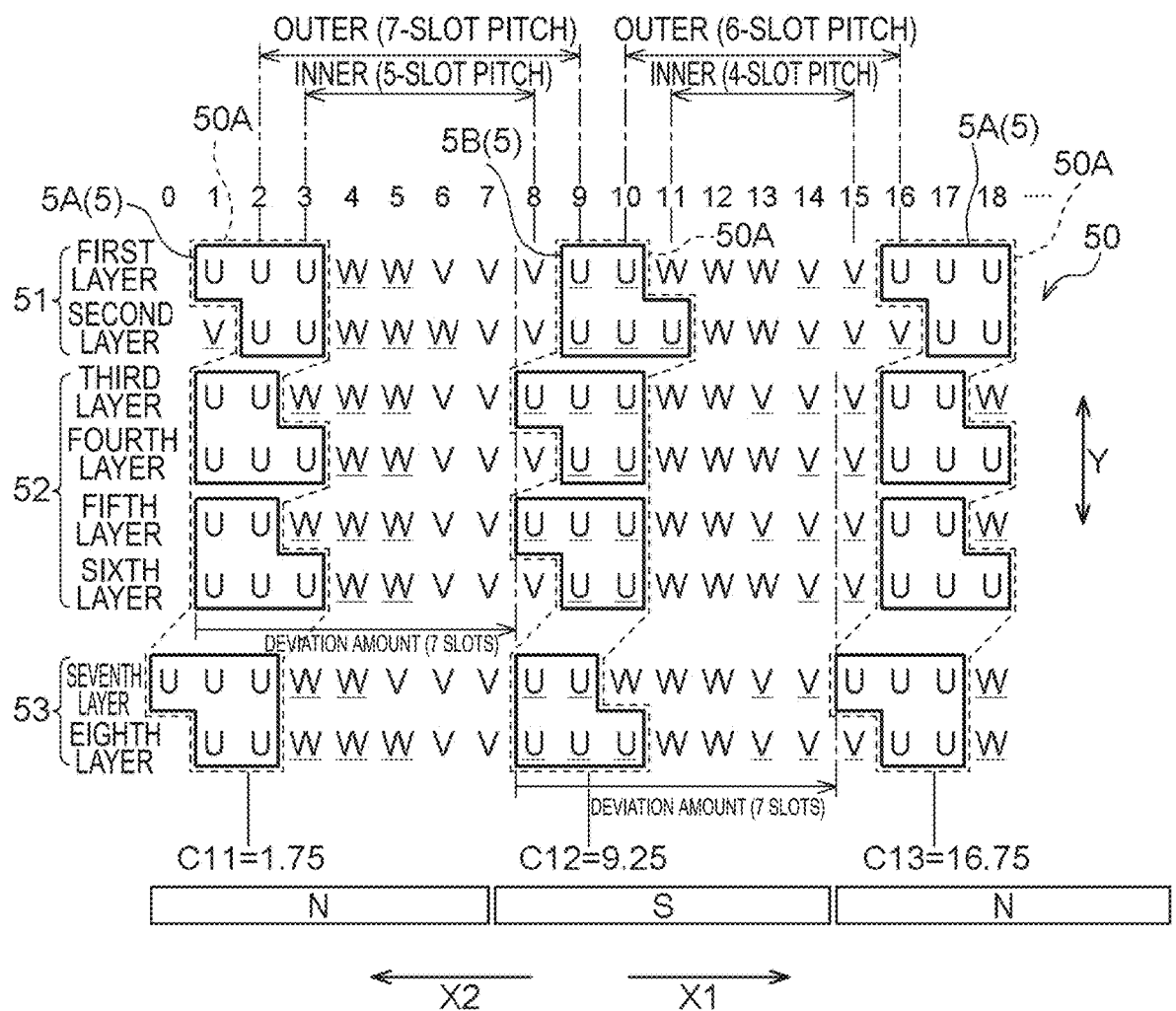
FIG. 5 is a schematic diagram illustrating an example of phase disposition of eight poles and sixty slots in the present embodiment.

FIGS. 5 to 8 illustrate the motor M having a fraction slot configuration of eight poles and sixty slots (Nspp=5/2, a=2, b=1, and c=2). FIG. 9 illustrates the motor M having an integer slot configuration of eight poles and seventy-two slots (Nspp=3, a=3, b=0, and c=1). In the motor M having the fraction slot configuration of eight poles and sixty slots, since a predetermined number of slots is 3×Nspp±1/c=7 or 8, in an example (hereinafter, simply referred to as the "present example") of the present embodiment illustrated in FIG. 5, the predetermined number of slots is seven, and, in the present example illustrated in FIG. 6, the predetermined number of slots is eight. In a fraction slot configuration, as illustrated in FIG. 4, when the second basic phase band group 52 is formed by deviating the first basic phase band group 51 by a predetermined number of slots (seven slots) in the rotational direction X1, a current direction is reverse per pole, and, thus, as illustrated in FIG. 5, a current direction in the second basic phase band group 52 is inversed (the same applies to FIG. 6). In the motor M having the integer slot configuration of eight poles and seventy-two slots, a predetermined number of slots is ±1, and thus a predetermined number of slots is one in the present example illustrated in FIG. 9.

In the present example illustrated in FIG. 5, a plurality of (number of series-connected windings Nt=20) coil sides 11a of the mixed phase band 50A disposed in the No. 0 slot to the No. 3 slot are one in the No. 0 slot, seven in the No. 1 slot, eight in the No. 2 slot, and four in the No. 3 slot. Thus, the center C11 of the plurality of coil sides 11a of the mixed phase band 50A is 1.75 as shown in the following Equation (4).

$$C11=(0\times1+1\times7+2\times8+3\times4)/(1+7+8+4)=1.75 \qquad (4)$$

Similarly, the center C12 of a plurality of (Nt=20) coil sides 11a of the mixed phase band 50A disposed in the No. 8 slot to the No. 11 slot is 9.25 as shown in the following Equation (5), and the center C13 of a plurality of (Nt=20) coil sides 11a of the mixed phase band 50A disposed in the No. 15 slot to the No. 18 slot is 16.75 as shown in the following Equation (6).

$$C12=(8\times4+9\times8+10\times7+11\times1)/(4+8+7+1)=9.25 \qquad (5)$$

$$C13=(15\times1+16\times7+17\times8+18\times4)/(1+7+8+4)=16.75 \qquad (6)$$

Figure 6:
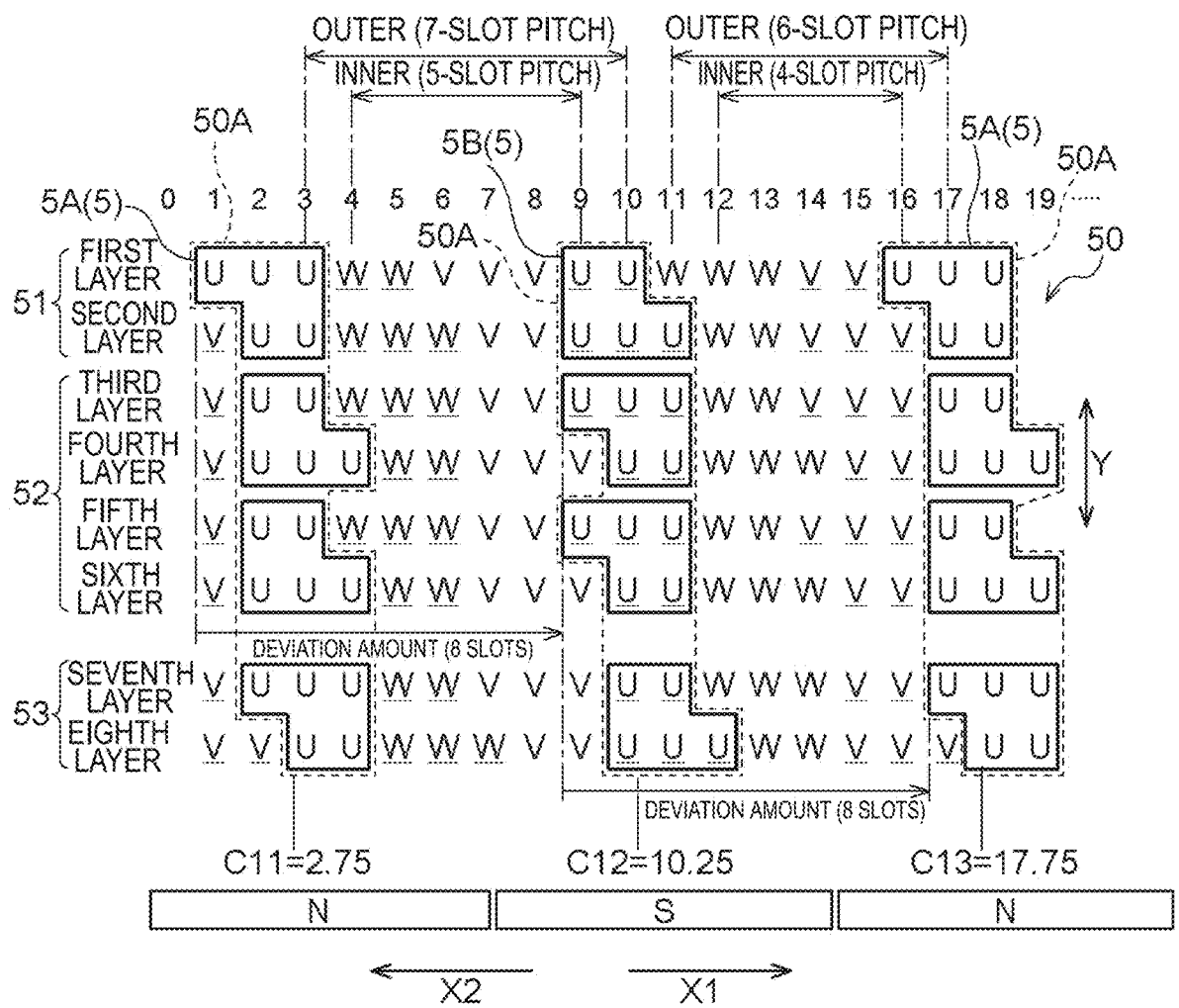
FIG. 6 is a schematic diagram illustrating an example of phase disposition of eight poles and sixty slots in the present embodiment.

In the present example illustrated in FIG. 6, a plurality of (number of series-connected windings Nt=20) coil sides 11a of the mixed phase band 50A disposed in the No. 1 slot to the No. 4 slot are one in the No. 1 slot, seven in the No. 2 slot, eight in the No. 3 slot, and four in the No. 4 slot. Thus, the center C11 of the plurality of coil sides 11a of the mixed phase band 50A is 2.75 as shown in the following Equation (7).

$$C11=(1\times1+2\times7+3\times8+4\times4)/(1+7+8+4)=2.75 \qquad (7)$$

Similarly, the center C12 of a plurality of (Nt=20) coil sides 11a of the mixed phase band 50A disposed in the No. 9 slot to the No. 12 slot is 10.25 as shown in the following Equation (8), and the center C13 of a plurality of (Nt=20) coil sides 11a of the mixed phase band 50A disposed in the No. 16 slot to the No. 19 slot is 17.75 as shown in the following Equation (9).

$$C12=(9\times4+10\times8+11\times7+12\times1)/(4+8+7+1)=10.25 \qquad (8)$$

$$C13=(16\times1+17\times7+18\times8+19\times4)/(1+7+8+4)=17.75 \qquad (9)$$

The number of the plurality of coil sides 11a forming the mixed phase band group 50 of the U phase is Nt=20 in all of the mixed phase bands 50A, and is uniform per pole. Thus, the magnitude of magnetomotive force generated when the windings of the stator 3 are conducted is uniform per pole. In the examples illustrated in FIGS. 5 and 6, a distance between the centers of the coil sides 11a of the adjacent mixed phase bands 50A of the same phase (U phase) in the circumferential direction X is C12−C11=7.5, and C13−C12=7.5, and is thus uniform per pole. Therefore, a magnetomotive force distribution becomes more equivalent per pole, and thus the motor M of the present embodiment may be regarded as coming closer to a state of having a single type of magnetomotive force distribution.

As mentioned above, in the present embodiment, rotational symmetry of a magnetomotive force distribution is improved. As a result, the motor M of the present embodiment enables excitation force in a low order (spatial deformation mode fourth order) to be reduced compared with an order (spatial deformation mode eighth order) depending on the number of magnetic poles (eight poles) of the rotor 2. Therefore, a rotation frequency matching an eigenfrequency of the stator core 31 increases, and can thus be set to the outside of a usage rotation frequency range. In other words, the motor M of the present embodiment can avoid a resonance chance of the rotor 2 and thus reduce noise and vibration of the motor M within the usage rotation frequency range.

When the number of layers of the first basic phase band group 51 in the radial direction Y is denoted by m1, the number of layers of the second basic phase band group 52 in the radial direction Y is denoted by m2, and the number of layers of the third basic phase band group 53 in the radial direction Y is denoted by m3, in the present examples illustrated in FIGS. 5 and 6, m1 is 2, m2 is 4, and m3 is 2 such that m1=m3 is based. On the other hand, as in the present example illustrated in FIG. 8, even when m1 is 4, m2 is 4, and m3 is 2 such that m1≠m3 is based, a magnetomotive force distribution can be made more uniform than in the comparison example illustrated in FIG. 7.

Figure 8:
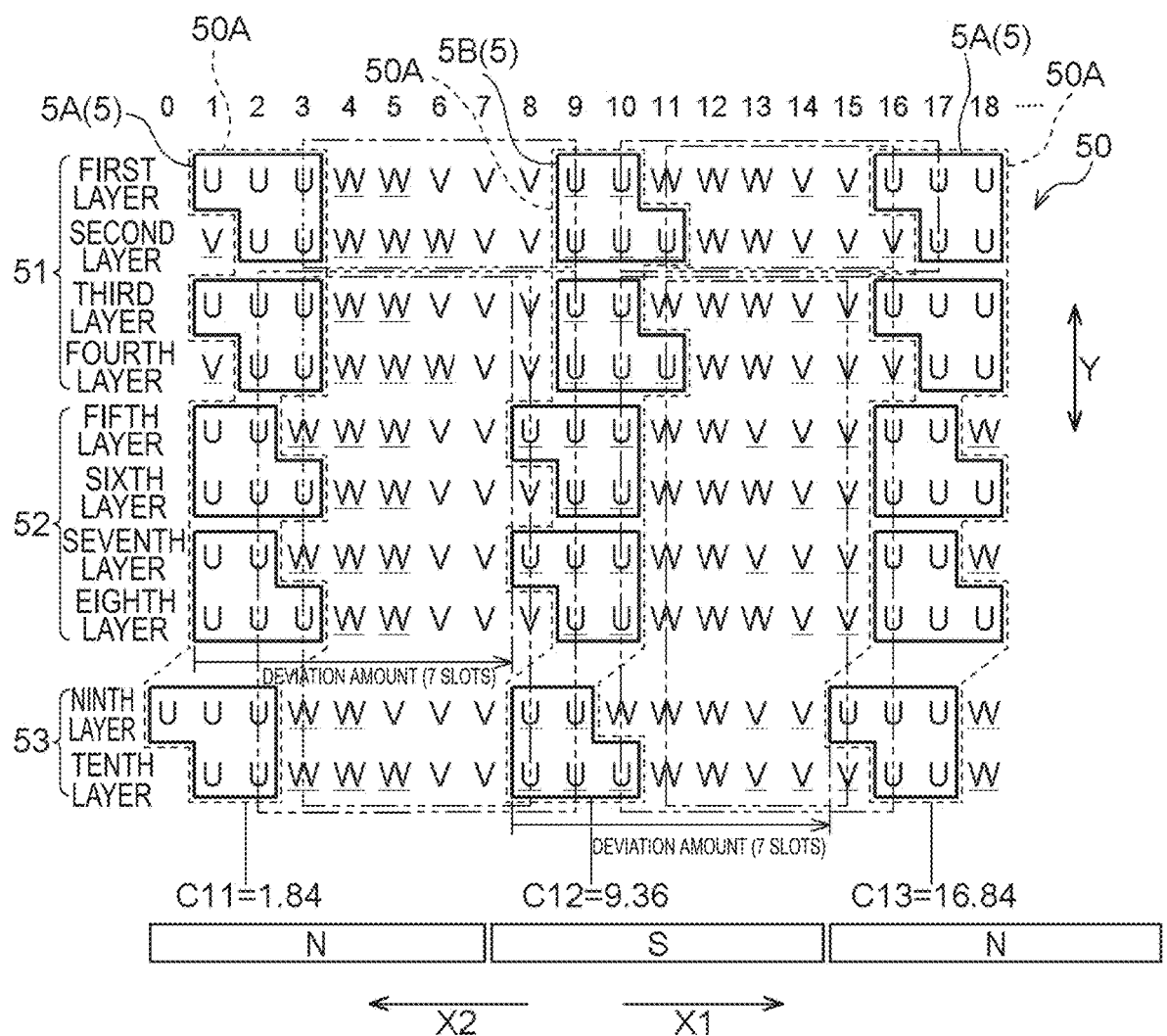
FIG. 8 is a schematic diagram illustrating an example of phase disposition of eight poles and sixty slots in the present embodiment.
Figure 9:
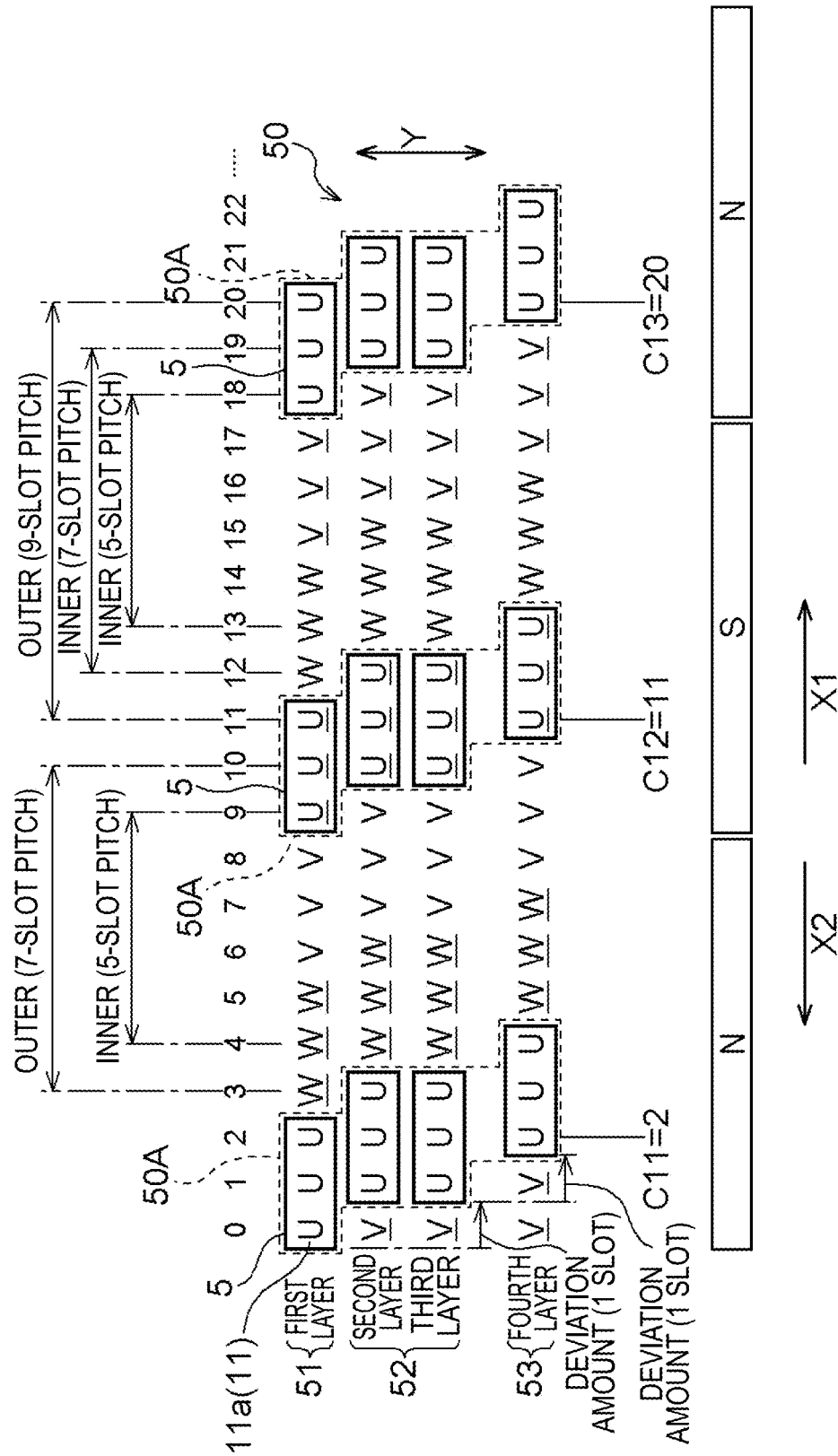
FIG. 9 is a schematic diagram illustrating an example of phase disposition of eight poles and seventy-two slots in the present embodiment.

For example, as illustrated in FIG. 8, in the motor M having eight poles and sixty slots (Nspp=5/2, a=2, b=1, and c=2), in a case of m1=4, m2=4, m3=2, and Nt=25, C11 is 1.84, C12 is 9.36, and C13 is 16.84. As a result, C12−C11=7.52 and C13−C12=7.48 are obtained, and thus a magnetomotive force distribution is more uniform in the present example illustrated in FIG. 8 than in the comparison example (C12−C11=7.6 and C13−C12=7.4) illustrated in FIG. 7. As mentioned above, the motor M having the fraction slot configuration of c=2 of the present embodiment includes the three types of basic phase band groups 51, 52, and 53 respectively deviated by a predetermined number of slots, and thus enables rotational symmetry of a magnetomotive force distribution to be improved, and noise and vibration of the motor M due to excitation force in a low order (spatial deformation mode fourth order) to be reduced.

As in the present example illustrated in FIG. 9, in the motor M having the integer slot configuration, the number of basic phase bands 5 in the first layer is three per pole, and thus magnetomotive force and a magnetomotive force distribution are uniform, but it will be verified that magnetomotive force and a magnetomotive force distribution are uniform even when three types of basic phase band groups 51, 52, and 53 respectively deviated by a predetermined number of slots are provided as in the present embodiment. As described above, in the motor M of the present embodiment, the mixed phase band group 50 is provided in which the first basic phase band group 51 as an aggregate in which each of a plurality of basic phase bands 5 is disposed per pole, the second basic phase band group 52 obtained by deviating the first basic phase band group 51 by a predetermined number of slots (one slot) in the rotational direction X1 of the rotor 2, and the third basic phase band group 53 obtained by deviating the second basic phase band group 52 in the rotational direction X1 by a predetermined number of slots (one slot) are stacked in this order from the outer radial direction Y2 of the slots 32 in the inner radial direction Y1.

In the present example of eight poles and seventy-two slots illustrated in FIG. 9, a plurality of (number of series-connected windings Nt=12) coil sides 11a of the mixed phase band 50A disposed in the No. 0 slot to the No. 4 slot are one in the No. 0 slot, three in the No. 1 slot, four in the No. 2 slot, three in the No. 3 slot, and one in the No. 4 slot.

Thus, the center C11 of the plurality of coil sides 11a of the mixed phase band 50A is 2 as shown in the following Equation (10).

$$C11=(0\times1+1\times3+2\times4+3\times3+4\times1)/(1+3+4+3+1)=2 \quad (10)$$

Similarly, the center C12 of a plurality of (Nt=12) coil sides 11a of the mixed phase band 50A disposed in the No. 9 slot to the No. 13 slot is 11 as shown in the following Equation (11), and the center C13 of a plurality of (Nt=12) coil sides 11a of the mixed phase band 50A disposed in the No. 18 slot to the No. 22 slot is 21 as shown in the following Equation (12).

$$C12=(9\times1+10\times3+11\times4+12\times3+13\times1)/(1+3+4+3+1)=11 \quad (11)$$

$$C13=(18\times1+19\times3+20\times4+21\times3+22\times1)/(1+3+4+3+1)=20 \quad (12)$$

As mentioned above, in the motor M having the integer slot configuration, the number of the plurality of coil sides 11a forming the mixed phase band group 50 of the U phase is Nt=12 in all of the mixed phase bands 50A, and is uniform per pole. Thus, the magnitude of magnetomotive force generated when the windings of the stator 3 are conducted is uniform per pole. In the example illustrated in FIG. 9, a distance between the centers of the coil sides 11a of the mixed phase bands 50A of the same phase (U phase) in the circumferential direction X is C12−C11=9, and C13−C12=9, and is thus uniform per pole, and matches the number of slots per pole, that is, a field pole pitch of 72/8=9. Therefore, a magnetomotive force distribution is equivalent per pole, and thus the motor M of the present embodiment may be regarded as having a single type of magnetomotive force distribution.

When the number of layers of the first basic phase band group 51 in the radial direction Y is denoted by m1, the number of layers of the second basic phase band group 52 in the radial direction Y is denoted by m2, and the number of layers of the third basic phase band group 53 in the radial direction Y is denoted by m3, in the present example illustrated in FIG. 9, m1 is 1, m2 is 2, and m3 is 1 such that m1=m3 is based. On the other hand, although not illustrated, in the motor M having an integer slot configuration, even when m1 is 2, m2 is 2, and m3 is 1 such that m1≠m3 is based, a magnetomotive force distribution is uniform.

For example, in the motor M having eight poles and seventy-two slots, in a case of m1=2, m2=2, and m3=1, C11 is 1.8, C12 is 10.8, and C13 is 19.8. As a result, C12−C11=9 and C13−C12=9 are obtained, and thus a magnetomotive force distribution is equivalent per pole such that the motor M of the present embodiment may be regarded as having a single type of magnetomotive force distribution. As mentioned above, the motor M having the integer slot configuration of the present embodiment enables rotational symmetry of a magnetomotive force distribution to be maintained, and noise and vibration of the motor M to be reduced even in a case of including three types of basic phase band groups 51, 52, and 53 respectively deviated by a predetermined number of slots.

In the present examples illustrated in FIGS. 10 to 17, variations of m2 at m1=m3 will be described. FIG. 10 illustrates the motor M having a fraction slot configuration of eight poles and thirty-six slots (Nspp=3/2, a=1, b=1, and c=2); FIG. 11 illustrates the motor M having a fraction slot configuration of eight poles and sixty slots (Nspp=5/2, a=2, b=1, and c=2); FIG. 12 illustrates the motor M having a fraction slot configuration of eight poles and eighty-four slots (Nspp=7/2, a=3, b=1, and c=2); and FIG. 13 illustrates the motor M having a fraction slot configuration of eight poles and 108 slots (Nspp=9/2, a=4, b=1, and c=2). FIG. 14 illustrates the motor M having an integer slot configuration of eight poles and twenty-four slots (Nspp=1, a=1, b=0, and c=1); FIG. 15 illustrates the motor M having an integer slot configuration of eight poles and forty-eight slots (Nspp=2, a=1, b=0, and c=1); FIG. 16 illustrates the motor M having an integer slot configuration of eight poles and seventy-two slots (Nspp=3, a=1, b=0, and c=1); and FIG. 17 illustrates the motor M having an integer slot configuration of eight poles and ninety-six slots (Nspp=4, a=1, b=0, and c=1). In all of the present examples, m1 or m3 is 1, but the same advantageous effect can also be achieved even when m1, m2, and m3 are multiples, and thus detailed description will be omitted.

First, a description will be made of the motor M having a fraction slot configuration of c=2. In the motor M of a fraction slot configuration of eight poles and thirty-six slots, a predetermined number of slots is 3×Nspp±1/c=4 or 5, a predetermined number of slots is four in the present example illustrated in FIG. 10. (m1, m2, m3, Nt)=(2, 2, 2, 9), (2, 4, 2, 12), (2, 6, 2, 15), and (2, 8, 2, 18) is obtained in this order from an upper stage toward a lower stage in FIG. 10. In this case, the centers C11, C12, and C13 of a plurality of coil sides 11a of the mixed phase band 50A disposed in the No. 0 slot to No. 2 slot, the No. 5 slot to No. 7 slot, and the No. 9 slot to No. 11 slot are (C11, C12, C13)=(11/9, 52/9, 92/9), (15/12, 69/12, 123/12), (19/15, 86/15, 154/15), and (23/18, 103/18, 185/18) sequentially from the upper stage toward the lower stage in FIG. 10. Distances between the centers of the coil sides 11a of the mixed phase bands 50A of the same phase (U phase) adjacent to each other in the circumferential direction X are (C12−C11, C13−C12)=(41/9, 40/9), (54/12, 54/12), (67/15, 68/15), and (80/18, 82/18) in this order from the upper stage toward the lower stage in FIG. 10. As mentioned above, rotational symmetry of a magnetomotive force distribution can be improved, and thus noise and vibration of the motor M can be reduced, compared with the basic type motor M (the centers (5/3, 19/3, 32/3)) formed of only the first layer and the second layer, and the inter-center distances (14/3, 13/3).

In the motor M having a fraction slot configuration of eight poles and sixty slots, a predetermined number of slots is 3×Nspp±1/c=7 or 8, a predetermined number of slots is seven in the present example illustrated in FIG. 11. (m1, m2, m3, Nt)=(2, 2, 2, 15), (2, 4, 2, 20), (2, 6, 2, 25), and (2, 8, 2, 30) is obtained in this order from an upper stage toward a lower stage in FIG. 11. In this case, the centers C11, C12, and C13 of a plurality of coil sides 11a of the mixed phase band 50A disposed in the No. 0 slot to No. 3 slot, the No. 8 slot to No. 11 slot, and the No. 15 slot to No. 18 slot are (C11, C12, C13)=(26/15, 139/15, 251/15), (35/20, 185/20, 335/20), (44/25, 231/25, 419/25), and (53/30, 277/30, 503/30) sequentially from the upper stage toward the lower stage in FIG. 11. Distances between the centers of the coil sides 11a of the mixed phase bands 50A of the same phase (U phase) adjacent to each other in the circumferential direction X are (C12−C11, C13−C12)=(113/15, 112/15), (150/20, 150/20), (187/25, 188/25), and (224/30, 226/30) in this order from the upper stage toward the lower stage in FIG. 11. As mentioned above, rotational symmetry of a magnetomotive force distribution can be improved, and thus noise and vibration of the motor M can be reduced, compared with the basic type motor M (the centers (11/5, 49/5, 86/5)) formed of only the first layer and the second layer, and the inter-center distances (38/5, 37/5).

In the motor M having a fraction slot configuration of eight poles and eighty-four slots, since a predetermined number of slots is 3×Nspp±1/c=10 or 11, a predetermined number of slots is ten in the present example illustrated in FIG. 12. (m1, m2, m3, Nt)=(2, 2, 2, 21), (2, 4, 2, 28), (2, 6, 2, 35), and (2, 8, 2, 42) is obtained in this order from an upper stage toward a lower stage in FIG. 12. In this case, the centers C11, C12, and C13 of a plurality of coil sides 11a of the mixed phase band 50A disposed in the No. 0 slot to No. 4 slot, the No. 11 slot to No. 15 slot, and the No. 21 slot to No. 25 slot are (C11, C12, C13)=(47/21, 268/21, 488/21), (63/28, 357/28, 651/28), (79/35, 446/35, 814/35), and (95/42, 535/42, 977/42) sequentially from the upper stage toward the lower stage in FIG. 12. Distances between the centers of the coil sides 11a of the mixed phase bands 50A of the same phase (U phase) adjacent to each other in the circumferential direction X are (C12−C11, C13−C12)=(221/21, 220/21), (294/28, 294/28), (367/35, 368/35), and (440/42, 442/42) in this order from the upper stage toward the lower stage in FIG. 12. As mentioned above, rotational symmetry of a magnetomotive force distribution can be improved, and thus noise and vibration of the motor M can be reduced, compared with the basic type motor M (the centers (19/7, 93/7, 166/7)) formed of only the first layer and the second layer, and the inter-center distances (74/7, 73/7).

In the motor M of a fraction slot configuration of eight poles and 108 slots, since a predetermined number of slots is 3×Nspp±1/c=13 or 14, a predetermined number of slots is thirteen in the present example illustrated in FIG. 13. (m1, m2, m3, Nt)=(2, 2, 2, 27), (2, 4, 2, 36), (2, 6, 2, 45), and (2, 8, 2, 54) is obtained in this order from an upper stage toward a lower stage in FIG. 13. In this case, the centers C11, C12, and C13 of a plurality of coil sides 11a of the mixed phase band 50A disposed in the No. 0 slot to No. 5 slot, the No. 15 slot to No. 20 slot, and the No. 29 slot to No. 34 slot are (C11, C12, C13)=(74/27, 439/27, 803/27), (99/36, 585/36, 1071/36), (124/45, 731/45, 1339/45), and (149/54, 877/54, 1607/54) sequentially from the upper stage toward the lower stage in FIG. 13. Distances between the centers of the coil sides 11a of the mixed phase bands 50A of the same phase (U phase) adjacent to each other in the circumferential direction X are (C12−C11, C13−C12)=(365/27, 364/27), (486/36, 486/36), (607/45, 608/45), and (728/54, 730/54) in this order from the upper stage toward the lower stage in FIG. 13. As mentioned above, rotational symmetry of a magnetomotive force distribution can be improved, and thus noise and vibration of the motor M can be reduced, compared with the basic type motor M (the centers (29/9, 151/9, 272/9)) formed of only the first layer and the second layer, and the inter-center distances (122/9, 121/9).

As mentioned above, in the motor M having the fraction slot configuration of c=2, the first pole basic phase band 5A and the second pole basic phase band 5B respectively facing a pair of magnetic poles (two poles) adjacent to each other among a plurality of magnetic poles (eight poles in a case of eight poles and sixty slots) are the basic phase bands 5 having mutual phase differences, and each thereof includes the three types of basic phase band groups 51, 52, and 53 respectively deviated by a predetermined number of slots. Thus, magnetomotive force and a magnetomotive force distribution become further uniform.

Next, a description will be made of the motor M having an integer slot configuration. In the motor M having the integer slot configuration, the coil sides 11a of the mixed phase bands 50A adjacent to each other have the same configuration, and thus distances between the centers of the coil sides 11a of the mixed phase bands 50A of the same phase (U phase) adjacent to each other are three slots, six slots, nine slots, and twelve slots in an order of FIGS. 14 to 17. As mentioned above, since the three types of basic phase band groups 51, 52, and 53 respectively deviated by a predetermined number of slots are provided, a phase band distribution becomes smoother while rotational symmetry of magnetomotive force distribution is maintained, and thus a torque ripple of the motor M is reduced such that noise and vibration caused thereby can be reduced.

Phase Disposition of Stator 3 Suitable for Concentric Winding

When m1 denoting the number of layers of the first basic phase band group 51 in the radial direction Y is the same as the m3 denoting the number of layers of the third basic phase band group 53 in the radial direction Y (m1=m3), the first unit coil 11A and the second unit coil 11B of the first pole coil 10A or the third unit coil 11C and the fourth unit coil 11D of the second pole coil 10B, having the concentric winding configuration as illustrated in FIG. 3, may have a continuous winding configuration. In the present example illustrated in FIG. 5, the number of coil sides 11a of the mixed phase bands 50A present in each of the No. 2 slot and the No. 9 slot is eight, and an integrated coil may be obtained by continuously winding an aggregate of the unit coils 11 serving as outer coils of the concentric winding. Similarly, the number of coil sides 11a of the mixed phase bands 50A present in each of the No. 3 slot and the No. 8 slot is four, and an integrated coil may be obtained by continuously winding an aggregate of the unit coils 11 serving as inner coils of the concentric winding. When the coil sides 11a of the mixed phase bands 50A of the U phase present in the No. 2 slot and No. 9 slot, and the No. 3 slot and the No. 8 slot are inserted into the slot 32 as integrated coils, and then an integrated coil with the V phase or the W phase is inserted thereinto, it is possible to simplify and miniaturize routing of a winding inserted into each slot 32 and thus to improve workability in work of mounting the winding.

On the other hand, as in the present example illustrated in FIG. 8, in the motor M (Nspp=5/2, a=2, b=1, and c=2) having eight poles and sixty slots, when m1 is 4, m2 is 4, m3 is 2, and Nt is 25 (m1≠m3), as indicated by a two-dot chain line, an aggregate of the unit coils 11 of the concentric winding cannot be continuously wound. For example, it is necessary to provide aggregates of the unit coils 11 of the concentric winding corresponding to the first layer and the second layer in the No. 3 slot and the No. 9 slot, and to provide other aggregates of the unit coils 11 of the concentric winding corresponding to the third layer to the tenth layer in the No. 3 slot and the No. 8 slot, and thus two types of aggregates of the unit coils 11 are necessary in the No. 3 slot.

In other words, in a case of m1=m3, as illustrated in FIGS. 10 to 17, the coil sides 11a of the mixed phase band 50A may be handled as an integrated coil to be used as an inner coil or an outer coil of the concentric winding.

In the concentric winding, a ratio of each phase (for example, the U phase) in each slot 32 is summarized as a concentric winding configuration in FIGS. 10 to 17. The present inventor has found that a ratio of each phase can be computed by using a turn ratio n=M/m1 (where M=m1+m2+m3) of the unit coils 11 forming the concentric winding. In the illustrated concentric winding configuration, a winding configuration of the pole pair coils 10 is expressed as the first pole coil 10A & the second pole coil 10B, and portions connected via "-" indicate inner coils in order from an outer coil in each of the pole coils 10A and 10B.

First, a description will be made of the motor M having a fraction slot configuration. In a case of the motor M having Nspp=1.5 illustrated in FIG. 10, 1/2&((2n−1)/2n)−(1/2n) is given. For example, in a case of m1=2, m2=2, and m3=3, n is 3, and thus ½&⅚-⅙ may be obtained. In other words, the first pole coils 10A with the U phase wound on the No. 2 slot and the No. 5 slot occupy three layers among the six layers, outer coils of the second pole coils 10B with the U phase wound on the No. 6 slot and the No. 10 slot occupy five layers among the six layers, and inner coils of the second pole coils 10B with the U phase wound on the No. 7 slot and the No. 9 slot occupy one layer among the six layers.

In a case of the motor M having Nspp=2.5 illustrated in FIG. 11, the integer part a of the simple mixed fraction increases by 1 compared with the case of FIG. 10, and thus a single concentric coil is added to a pole coil occupying a smaller number of layers of the pole coils 10A and 10B, herein, to the first pole coil 10A in contrast to FIG. 10, and thus 1-1/2&((2n−1)/2n)−(1/2n) may be given. In a case of the motor M having Nspp=3.5 illustrated in FIG. 12, the integer part a of the simple mixed fraction increases by 1 compared with the case of FIG. 11, and thus a single concentric coil is added to a pole coil occupying a smaller number of layers of the pole coils 10A and 10B, herein, to the second pole coil 10B in contrast to FIG. 11, and thus 1-1/2&1-((2n−1)/2n)−(1/2n) may be given. In a case of the motor M having Nspp=4.5 illustrated in FIG. 13, the integer part a of the simple mixed fraction increases by 1 compared with the case of FIG. 12, and thus a single concentric coil is added to a pole coil occupying a smaller number of layers of the pole coils 10A and 10B, herein, to the first pole coil 10A in contrast to FIG. 12, and thus 1-1-1/2&1-((2n−1)/2n)−(1/2n) may be given. As mentioned above, in a case of the motor M having the fraction slot configuration, the concentric winding configuration may be represented by using the common rule.

Next, a description will be made of the motor M having an integer slot configuration. In a case of the motor M having Nspp=1 illustrated in FIG. 14, 1/n&((n−2)/n)−(1/n) is given. For example, in a case of m1=1, m2=1, and m3=1, n is 3, and thus 1/3&1/3-1/3 may be obtained. In a case of the motor M having Nspp=2 illustrated in FIG. 15, ((n−1)/n)−(1/n)&((n−1)/n)−(1/n) is given. For example, in a case of m1=1, m2=1, and m3=1, n is 3, and thus 2/3-1/3&2/3-1/3 may be obtained.

In a case of the motor M having Nspp=3 illustrated in FIG. 16, the integer part a of the simple mixed fraction increases by 1 compared with the case of FIG. 15, and thus a single concentric coil is added to a pole coil occupying a smaller number of layers of the pole coils 10A and 10B in contrast to FIG. 15, but the pole coil configurations in FIG. 15 are the same as each other, and thus the same result is obtained no matter which one thereof a single concentric coil is added to. Therefore, herein, a single concentric coil is added to the second pole coil 10B, and thus ((n−1)/n)−(1/n)&1-((n−1)/n)−(1/n) may be given. In a case of the motor M having Nspp=4 illustrated in FIG. 17, the integer part a of the simple mixed fraction increases by 1 compared with the case of FIG. 16, and thus a single concentric coil is added to a pole coil occupying a smaller number of layers of the pole coils 10A and 10B in contrast to FIG. 16, herein, to the first pole coil 10A, and thus 1-((n−1)/n)−(1/n)&1-((n−1)/n)−(1/n) may be given. As mentioned above, in a case of the motor M having the integer slot configuration, with respect to Nspp=2 or greater, the concentric winding configuration may be represented by using the common rule.

Ratio Among m1, m2, and m3

Noise and vibration caused by a fraction slot configuration depend on a fluctuation amplitude of magnetic attraction force between the rotor 2 and the stator 3, and thus a principal rotation order of noise and vibration may be acquired as follows, for example. Through magnetic field analysis, a magnetic flux density of a gap between the stator 3 and the rotor 2 is obtained, and a temporal-spatial distribution of electromagnetic attraction force generated between the stator 3 and the rotor 2 is acquired. The temporal-spatial distribution is subjected to Fourier expansion, and thus a spatial component (spatial deformation mode order) and a temporal component (a time order or a rotational direction) of the attraction force are acquired. A rotation order of noise and vibration is an order obtained by multiplying the spatial deformation mode order by the time order. Here, the time order is defined as the number of times for which spatial deformation in a spatial deformation mode order rotates by a mechanical angle of 360° of the rotor 2 (one rotation of the rotor 2 in the cylindrical motor M) per unit time (1 second).

Specifically, the motor M (Nspp=3/2, a=1, b=1, and c=2) having eight poles and thirty-six slots has rotation orders of noise and vibration such as an 8th order, a 16th order, a 32nd order, and a 40th order, the motor M (Nspp=5/2, a=2, b=1, and c=2) having eight poles and sixty slots has rotation orders of noise and vibration such as an 8th order, a 16th order, a 32nd order, a 40th order, a 56th order, and a 64th order, and the motor M (Nspp=7/2, a=3, b=1, and c=2) having eight poles and eighty-four slots has rotation orders of noise and vibration such as an 8th order, a 16th order, a 32nd order, a 40th order, a 56th order, a 64th order, an 80th order, and an 88th order. Among the orders, the 8th and 16th rotation orders are low rotation orders, and the other rotation orders are intermediate or high rotation orders.

Figure 18:
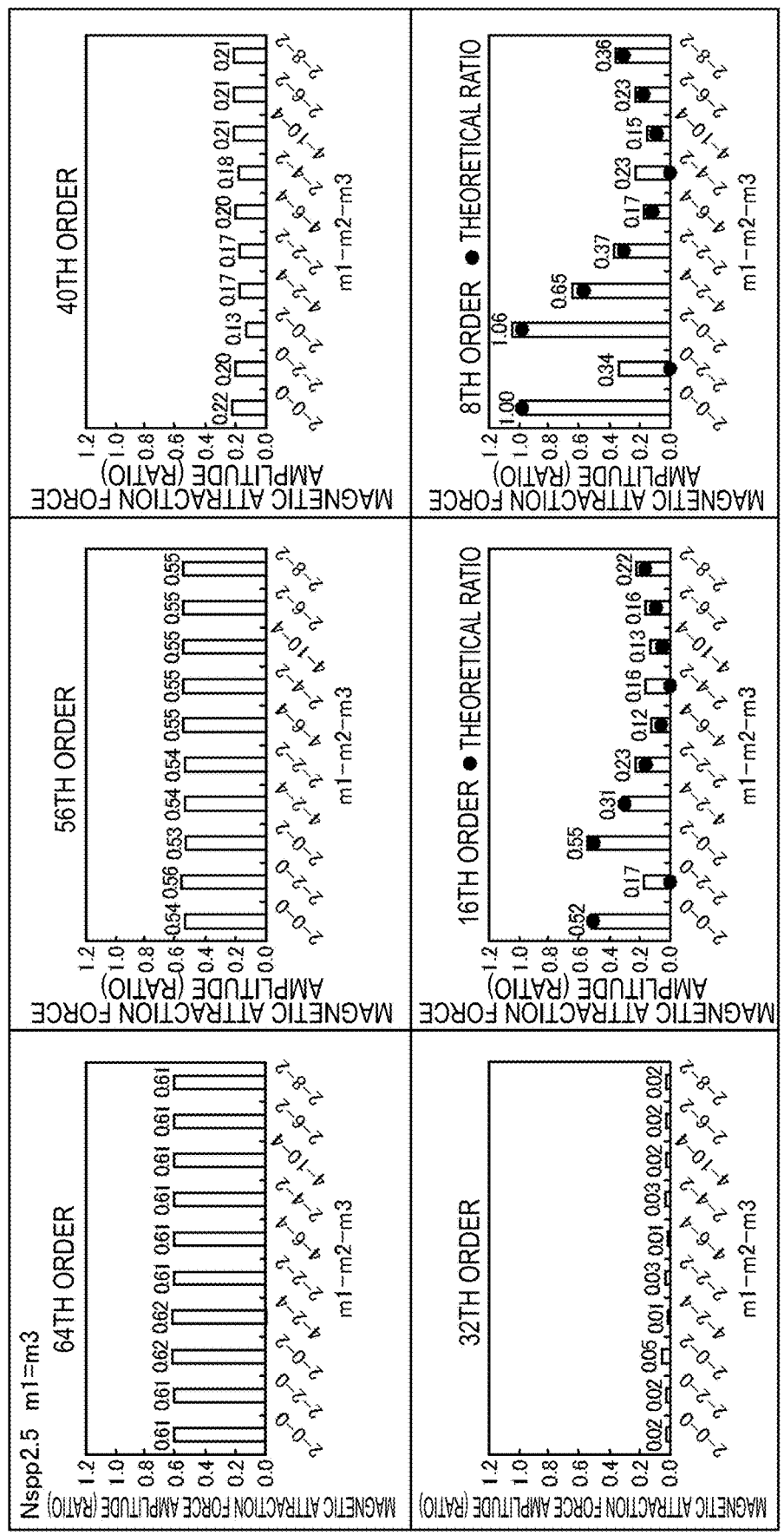
FIG. 18 is a diagram illustrating a simulation result of a magnetic attraction force amplitude ratio between a rotor and a stator in a rotating electric machine in which Nspp is 2.5 (m1=m3)

FIG. 18 illustrating a result of a magnetic attraction force amplitude ratio in each spatial deformation mode and time order, obtained through time and space Fourier analysis on electromagnetic attraction force generated between the stator 3 and the rotor 2 in the motor M having a fraction slot configuration of eight poles and sixty slots. Here, FIG. 18 illustrates a ratio when a magnetic attraction force amplitude in the radial direction Y at (m1, m2, m3, Nt)=(2, 0, 0, 5) (the winding configuration in FIG. 7) is set to 1 in the 8th rotation order. From FIG. 18, with respect to (m1, m2, m3, Nt)=(2, 0, 0, 5), (m1, m2, m3, Nt)=(2, 0, 2, 10) can reduce vibration and noise in the 16th and 8th rotation orders, but does not have the effect on other rotation orders. On the other hand, with respect to (m1, m2, m3, Nt)=(2, 0, 0, 5), (m1, m2, m3, Nt)=(2, 0, 2, 10) cannot reduce vibration and noise in the 16th and 8th rotation orders. In other words, it can be seen that, when the first basic phase band group 51 is mixed with the second basic phase band group 52 obtained by deviating the first basic phase band group 51 by a predetermined number of slots (seven slots in the present example) in the rotational direction X1, there is an effect of reducing noise and vibration in the corresponding rotation order, and, when the first basic phase band group 51 is mixed with the third basic phase band group 53 obtained by deviating the first basic phase band group 51 by twice the predetermined number of slots (fourteen slots in the present example) in the rotational direction X1, there is no effect of reducing noise and vibration in the corresponding rotation order. Therefore, (m1, m2, m3, Nt)=(0, 2, 2, 10) can also achieve the effect of reducing noise and vibration in the corresponding rotation order. From the above description, the present inventor has estimated that a ratio between a configuration (a set of effective phase differences) related to deviation by a predetermined number of slots and a configuration (independent basic configuration) unrelated to deviation by a predetermined number of slots is involved with a reduction amount of noise and vibration.

Therefore, the present inventor has defined a theoretical magnetic attraction force amplitude ratio (hereinafter, referred to as a "theoretical ratio") in the 8th rotation order on the basis of a relational expression (a ratio of the number of layers of an independent basic configuration not forming an effective phase difference to a total number of layers) of (M−2×Pm)/M (where M=m1+m2+m3, and Pm is a smaller one of (m1+m3) and m2). A theoretical ratio in the 16th rotation order is a value obtained by multiplying the theoretical ratio in the 8th rotation order by 0.52 (using analysis result amplitude ratios for the 8th and 16th rotation orders at (m1, m2, m3, Nt)=(2, 0, 0, 5). Here, the reason why Pm is doubled is that a value at which the number of layers m2 of the second basic phase band group 52 is the same as a sum of the number of layers m1 of the first basic phase band group 51 and the number of layers m3 of the third basic phase band group 53 having phase differences corresponding to a predetermined number of slots with respect to the second basic phase band group 52 is related to deviation by the predetermined number of slots, and a value by doubling a smaller one of (m1+m3) and m2 is a total number of layers related to deviation by the predetermined number of slots.

Figure 22:
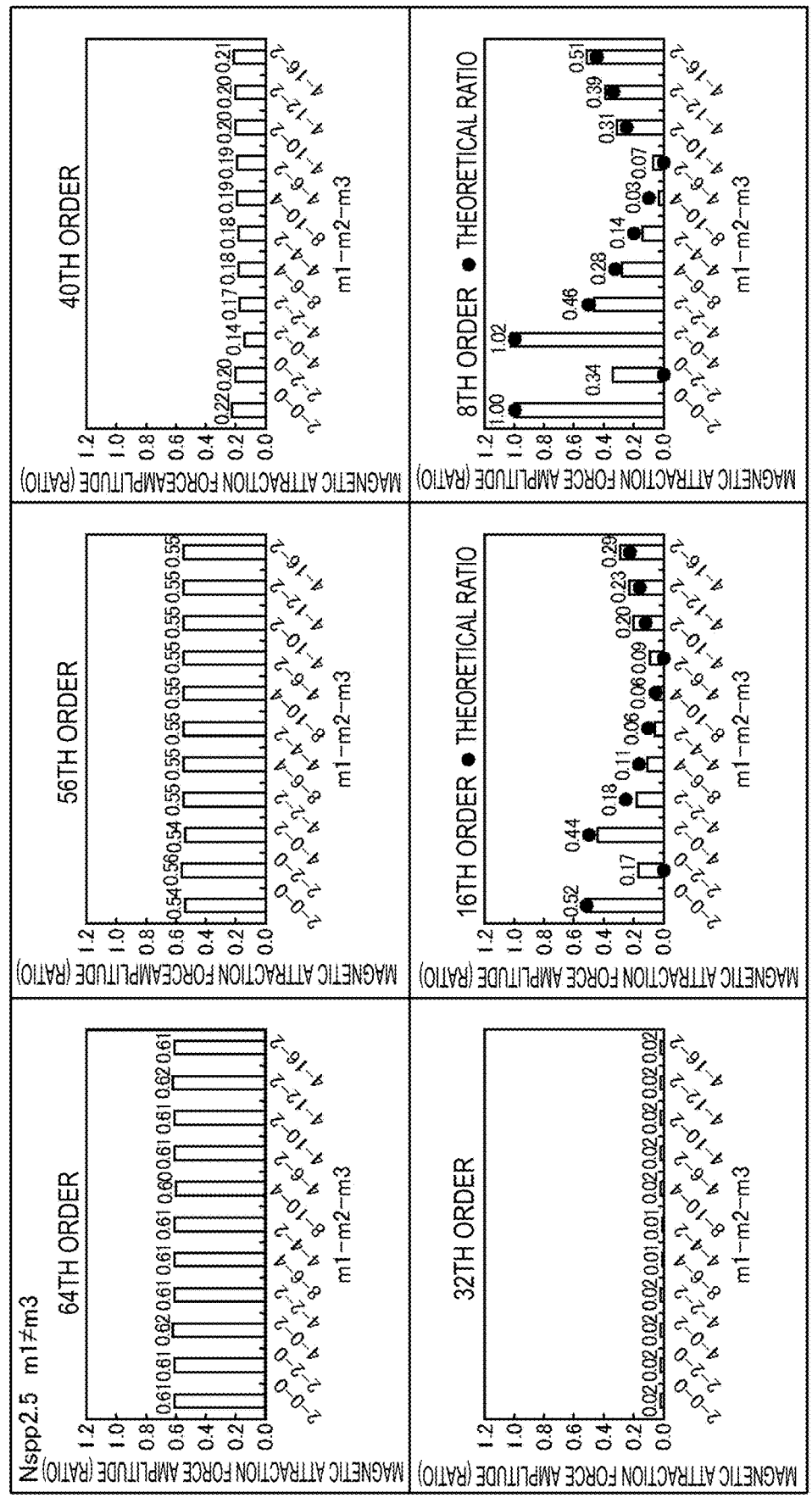
FIG. 22 is a diagram illustrating a simulation result of a magnetic attraction force amplitude ratio between a rotor and a stator in a rotating electric machine in which Nspp is 2.5 (m1≠m3)

FIGS. 18 and 22 illustrate a magnetic attraction force amplitude ratio result in each rotation order in the motor M having a fraction slot configuration of eight poles and sixty slots. As described above, a ratio is illustrated when a magnetic attraction force amplitude at (m1, m2, m3, Nt)=(2, 0, 0, 5) (the winding configuration in FIG. 7) in the radial direction Y is set to 1 in the 8th rotation order, and when reference values of (m1, m2, m3, Nt)=(2, 0, 0, 5) and (2, 2, 0, 10) are excluded, FIG. 18 illustrates the motor M having a relationship of m1=m3, and FIG. 22 illustrates the motor M having a relationship of m1≠m3.

Theoretical ratios in the 8th rotation order illustrated in FIG. 18 are (m1, m2, m3, Nt)=(2, 0, 0, 5)=1, (2, 2, 0, 10)=0, (2, 0, 2, 10)=1, (4, 2, 4, 25)=0.6, (2, 2, 2, 15)=0.33, (4, 6, 4, 35)=0.14, (2, 4, 2, 20)=0, (4, 10, 4, 45)=0.11, (2, 6, 2, 25)=0.2, and (2, 8, 2, 30)=0.33, and theoretical ratios in the 16th rotation order are values by multiplying the respective values by 0.52 (using analysis result amplitude ratios for the 8th and 16th rotation orders at (m1, m2, m3, Nt)=(2, 0, 0, 5)). Theoretical ratios in the 8th rotation order illustrated in FIG. 22 are (2, 0, 0, 5)=1, (2, 2, 0, 10)=0, (4, 0, 2, 15)=1, (4, 2, 2, 20)=0.5, (8, 6, 4, 45)=0.33, (4, 4, 2, 25)=0.2, (8, 10, 4, 55)=0.09, (4, 6, 2, 30)=0, (4, 10, 2, 40)=0.25, and (4, 12, 2, 45)=0.33, and theoretical ratios in the 16th rotation order are values by multiplying the respective values by 0.52 (using analysis result amplitude ratios for the 8th and 16th rotation orders at (m1, m2, m3, Nt)=(2, 0, 0, 5)).

Figure 19:
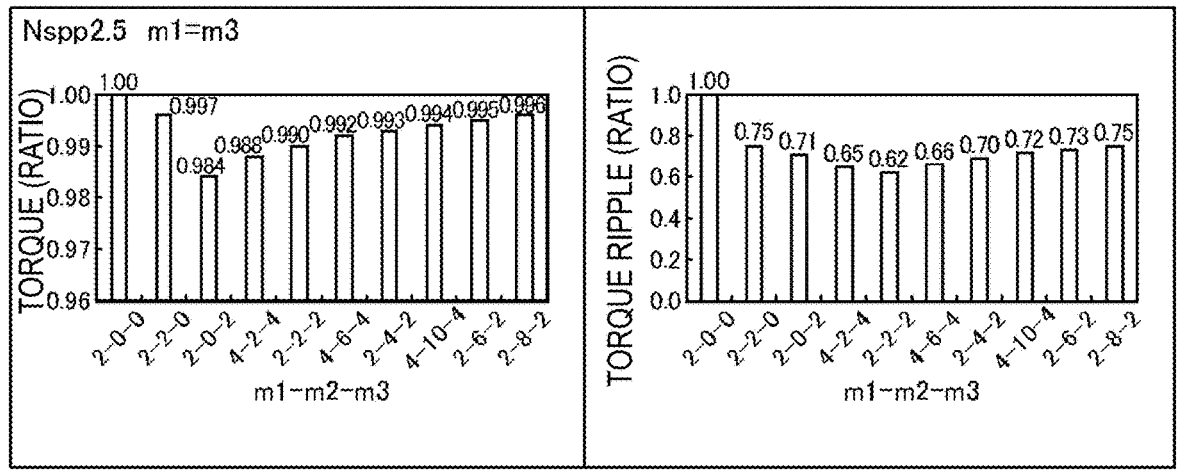
FIG. 19 is a diagram illustrating simulation results of torque and a torque ripple in the rotating electric machine in which Nspp is 2.5 (m1=m3)
Figure 23:
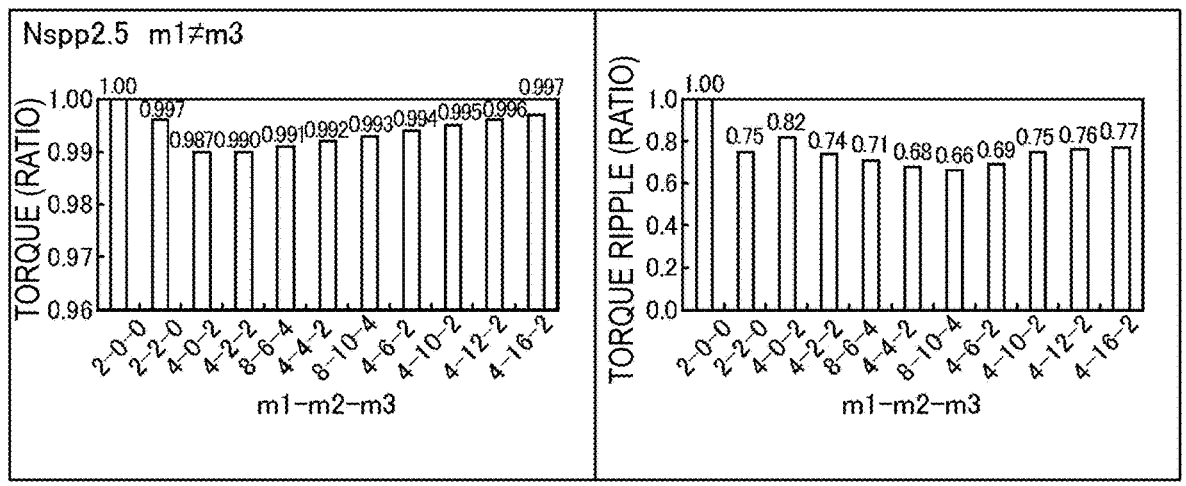
FIG. 23 is a diagram illustrating simulation results of torque and a torque ripple in the rotating electric machine in which Nspp is 2.5 (m1≠m3)

As shown in the 8th and 16th rotation orders in FIG. 18, it can be seen that the theoretical ratio substantially matches the analysis result. In other words, in the present embodiment, when the three types of basic phase band groups 51, 52, and 53 respectively deviated by a predetermined number of slots are provided (m1, m2, and m3 are all 1 or greater), it is possible to reduce noise and vibration in a low rotation order (8th order and 16th order). FIG. 19 illustrates results of analyzing a torque ratio and a torque ripple ratio through magnetic field analysis. As illustrated in FIG. 19, when three types of basic phase band groups 51, 52, and 53 respectively deviated by a predetermined number of slots are provided in the present embodiment, it can be seen that a torque reduction is small (2% or less), and a torque ripple can be reduced by 25% or more, compared with the comparison example ((m1, m2, m3, Nt)=(2, 0, 0, 5)). Similarly, as shown in analysis results in FIGS. 22 and 23, it can be seen that, even in a case of m1≠m3, noise and vibration in a low rotation order (8th and 16th orders) can be reduced, and a torque ripple can be reduced without substantially reducing torque compared with the comparison example. As mentioned above, options for m1, m2, and m3 can be increased, and thus options for the number of phase serial turns in the motor M can be increased.

Next, with reference to FIGS. 25 and 26, a description will be made of the motor M having the integer slot configuration of Nspp=2. As described above, in the motor M having the integer slot configuration, since all of the coil sides 11a of the mixed phase bands 50A adjacent to each other have the same configuration, distances between the centers of the coil sides 11a of the mixed phase bands 50A of the same phase (U phase) adjacent to each other are the same as each other, and rotational symmetry of a magnetomotive force distribution is maintained. Therefore, the influence on noise and vibration of the motor M due to the symmetry is small. Therefore, with respect to the motor M having the integer slot configuration, the influence of a torque ripple due to a winding will be examined.

Figure 25:
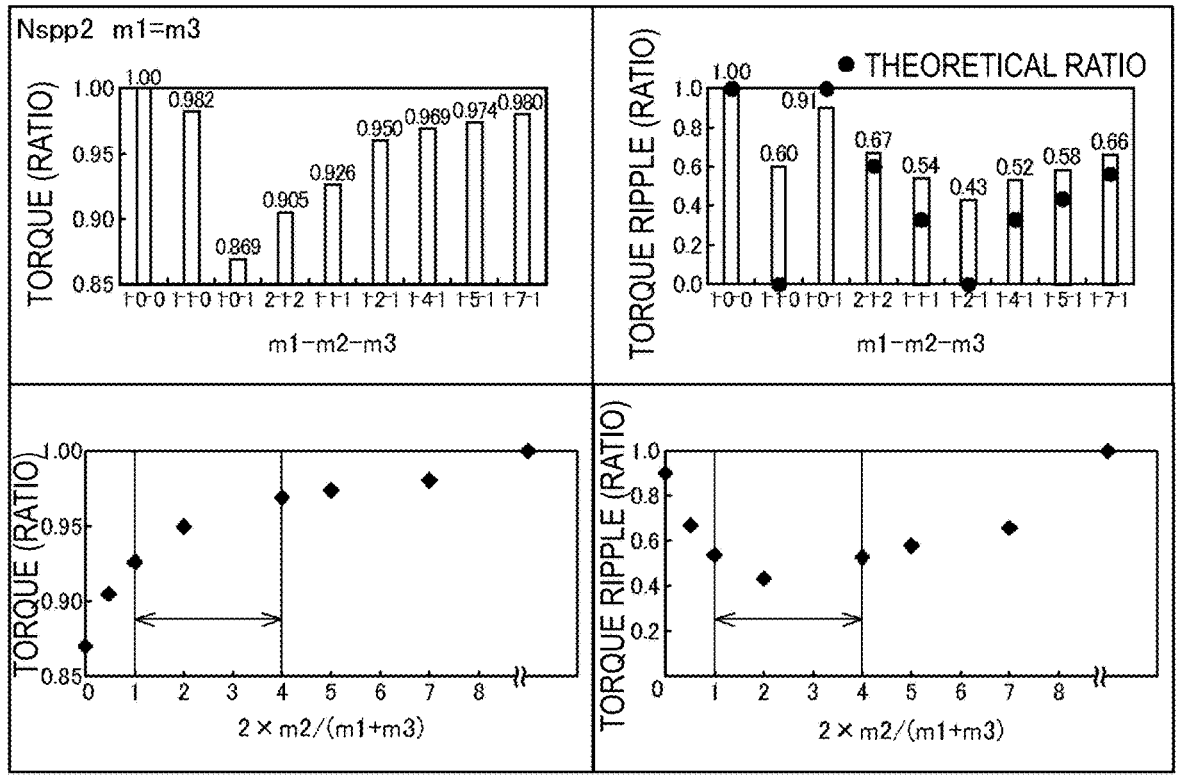
FIG. 25 is a diagram illustrating simulation results of torque and a torque ripple in a rotating electric machine in which Nspp is 2 (m1=m3)

FIG. 25 illustrates results of analyzing torque and a torque ripple through magnetic field analysis in the motor M having an integer slot configuration of eight poles and forty-eight slots. Here, FIG. 25 illustrates a ratio when torque and a torque ripple at (m1, m2, m3, Nt)=(1, 0, 0, 2) are set to 1. From FIG. 25, with respect to (m1, m2, m3, Nt)=(1, 0, 0, 2), (m1, m2, m3, Nt)=(1, 1, 0, 4) can reduce a torque ripple. On the other hand, with respect to (m1, m2, m3, Nt)=(1, 0, 0, 2), (m1, m2, m3, Nt)=(1, 0, 1, 4) cannot reduce a torque ripple. In other words, it can be seen that, when the first basic phase band group 51 is mixed with the second basic phase band group 52 obtained by deviating the first basic phase band group 51 by a predetermined number of slots (one slot in the present example) in the rotational direction X1, there is an effect of reducing a torque ripple, and, when the first basic phase band group 51 is mixed with the third basic phase band group 53 obtained by deviating the first basic phase band group 51 by twice the predetermined number of slots (two slots in the present example) in the rotational direction X1, there is a small effect of reducing a torque ripple. Therefore, (m1, m2, m3, Nt)=(0, 1, 1, 4) can also achieve the effect of reducing a torque ripple. From the above description, the present inventor has estimated that a ratio between a configuration (a set of effective phase differences) related to deviation by a predetermined number of slots and a configuration (independent basic configuration) unrelated to deviation by a predetermined number of slots is involved with a reduction amount of a torque ripple.

Therefore, the present inventor has defined a theoretical torque ripple ratio (hereinafter, referred to as a "theoretical ratio") on the basis of a relational expression (a ratio of the number of layers of an independent basic configuration not forming an effective phase difference to a total number of layers) of (M−2×Pm)/M (where M=m1+m2+m3, and Pm is a smaller one of (m1+m3) and m2. Here, the reason why Pm is doubled is that a value at which the number of layers m2 of the second basic phase band group 52 is the same as a sum of the number of layers m1 of the first basic phase band group 51 and the number of layers m3 of the third basic phase band group 53 having phase differences corresponding to a predetermined number of slots with respect to the second basic phase band group 52 is related to deviation by the predetermined number of slots, and a value by doubling a smaller one of (m1+m3) and m2 is a total number of layers related to deviation by the predetermined number of slots.

Figure 26:
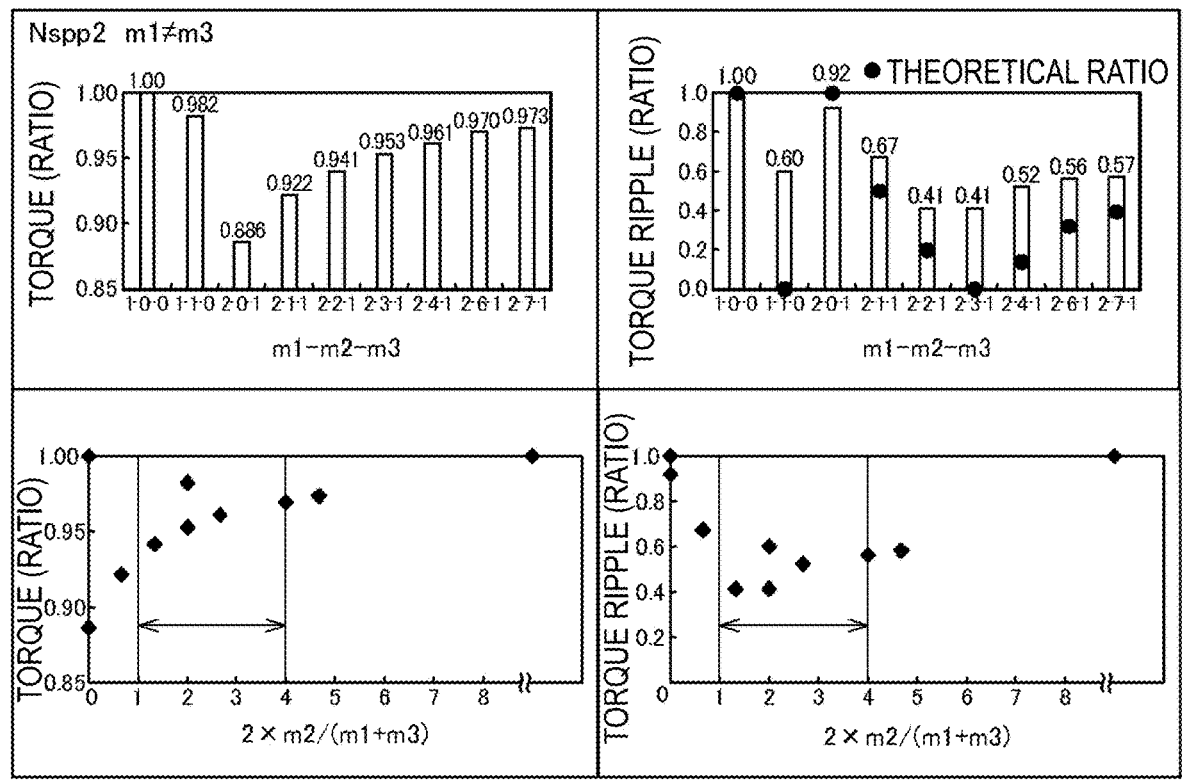
FIG. 26 is a diagram illustrating simulation results of torque and a torque ripple in a rotating electric machine in which Nspp is 2 (m1≠m3)

As described above, a ratio is illustrated when a torque ripple at (m1, m2, m3, Nt)=(1, 0, 0, 2) is set to 1, and when reference values of (m1, m2, m3, Nt)=(1, 0, 0, 2) and (1, 1, 0, 2) are excluded, FIG. 25 illustrates the motor M having a relationship of m1=m3, and FIG. 26 illustrates the motor M having a relationship of m1≠m3.

Theoretical ratios of a torque ripple illustrated in FIG. 25 are (m1, m2, m3, Nt)=(1, 0, 0, 2)=1, (1, 1, 0, 4)=0, (1, 0, 1, 4)=1, (2, 1, 2, 10)=0.6, (1, 1, 1, 6)=0.33, (1, 2, 1, 8)=0, (1, 4, 1, 12)=0.33, (1, 5, 1, 14)=0.43, and (1, 7, 1, 18)=0.56. Theoretical ratios of a torque ripple illustrated in FIG. 26 are (1, 0, 0, 2)=1, (1, 1, 0, 4)=0, (2, 0, 1, 6)=1, (2, 1, 1, 8)=0.5, (2, 2, 1, 10)=0.2, (2, 3, 1, 12)=0, (2, 4, 1, 14)=0.14, (2, 6, 1, 18)=0.33, and (2, 7, 1, 20)=0.40.

As shown in the torque ripple in FIG. 25, it can be seen that the theoretical ratio is similar to the tendency of the analysis result. In other words, in the present embodiment, when the three types of basic phase band groups 51, 52, and 53 respectively deviated by a predetermined number of slots are provided (m1, m2, and m3 are all 1 or greater), it can be seen that a torque ripple is reduced by 30% or more, and a torque reduction is relatively small (10% or less) compared with the comparison example ((m1, m2, m3, Nt)=(1, 0, 0, 2)). Similarly, as shown in analysis result in FIG. 26, it can be seen that, even in a case of m1≠m3, a torque ripple can be reduced, and torque is not almost reduced compared with the comparison example. As mentioned above, it can be seen that the definition for m1, m2, and m3 regarding noise and vibration in the motor M having a fraction slot configuration may be applied as the definition for m1, m2, and m3 regarding a torque ripple in the motor M having an integer slot configuration without being changed.

The present inventor has examined a simpler definition for m1, m2, and m3 causing noise and vibration in the motor M having a fraction slot configuration to be reduced and a torque ripple in the motor M having an integer slot configuration to be reduced. Therefore, the present inventor has assumed that, focusing on a ratio (2×m2/(m1+m3); a ratio of the number of layers with an effective phase difference) of the number of layers m2 of the second basic phase band group 52 to the sum of the number of layers m1 of the first basic phase band group 51 and the number of layers m3 of the third basic phase band group 53, a numerical value range causing noise and vibration in the motor M having a fraction slot configuration to be reduced and a torque ripple in the motor M having an integer slot configuration to be reduced may be defined in a unified manner. If this assumption is correct, variations of m1, m2, and m3 for obtaining useful performance improvement may be set regardless of the integer part a of Nspp or a relationship between m1 and m3.

The assumption will be further described. As an amount related to a ratio change of (m1, m2, m3), there is the turn ratio n=M/m1 (where M=m1+m2+m3) of the unit coils 11 forming the concentric winding. As described above, in the concentric winding configuration, a turn ratio of inner and outer coils depends on n in one pole coil of the pole pair coils 10 in the motor M having a fraction slot configuration and in both of pole coils of the pole pair coils 10 in the motor M having an integer slot configuration. Therefore, a characteristic change of the motor M due to a ratio change of (m1, m2, m3) results from a winding configuration change, and a specific content of the winding configuration change may be analyzed as a change of a turn ratio of inner and outer coils when expressed by the concentric winding configuration. From the above description, the turn ratio n of the unit coils 11 forming the concentric winding may be handed as an amount involved with noise and vibration in the motor M having a fraction slot configuration or a torque ripple in the motor M having an integer slot configuration. However, regarding n=M/m1, an appropriate range of n differs depending on a slot configuration (a fraction slot configuration or an integer slot configuration), the integer part a of Nspp, or a relationship between m1 and m3, and thus definition becomes complex. On the other hand, 2×m2/(m1+m3) based on the assumption becomes n×m1/(m1+m3)−2 which is an amount related to n, and is a more general ratio amount handled in a unified manner regardless of a slot configuration (a fraction slot configuration or an integer slot configuration), the integer part a of Nspp, or a relationship between m1 and m3. On the basis of the findings, the present inventor has found that variations of useful (m1, m2, m3) can be easily set according to a relationship among m1, m2, and m3 satisfying 2×m2/(m1+m3)>0 effective for characteristic improvement of the motor M.

Figure 20:
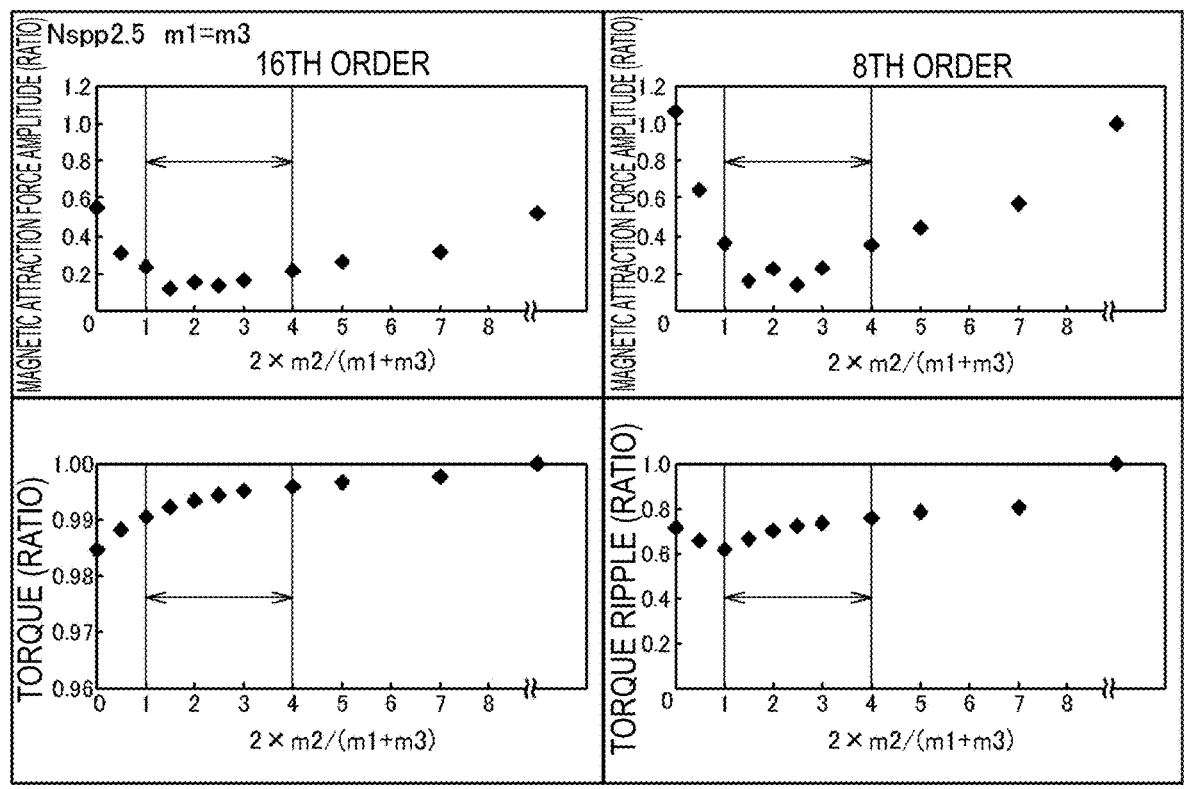
FIG. 20 is a diagram illustrating simulation results of a magnetic attraction force amplitude ratio between the rotor and the stator, torque, and a torque ripple in the rotating electric machine in which Nspp is 2.5 (m1=m3)
Figure 21:
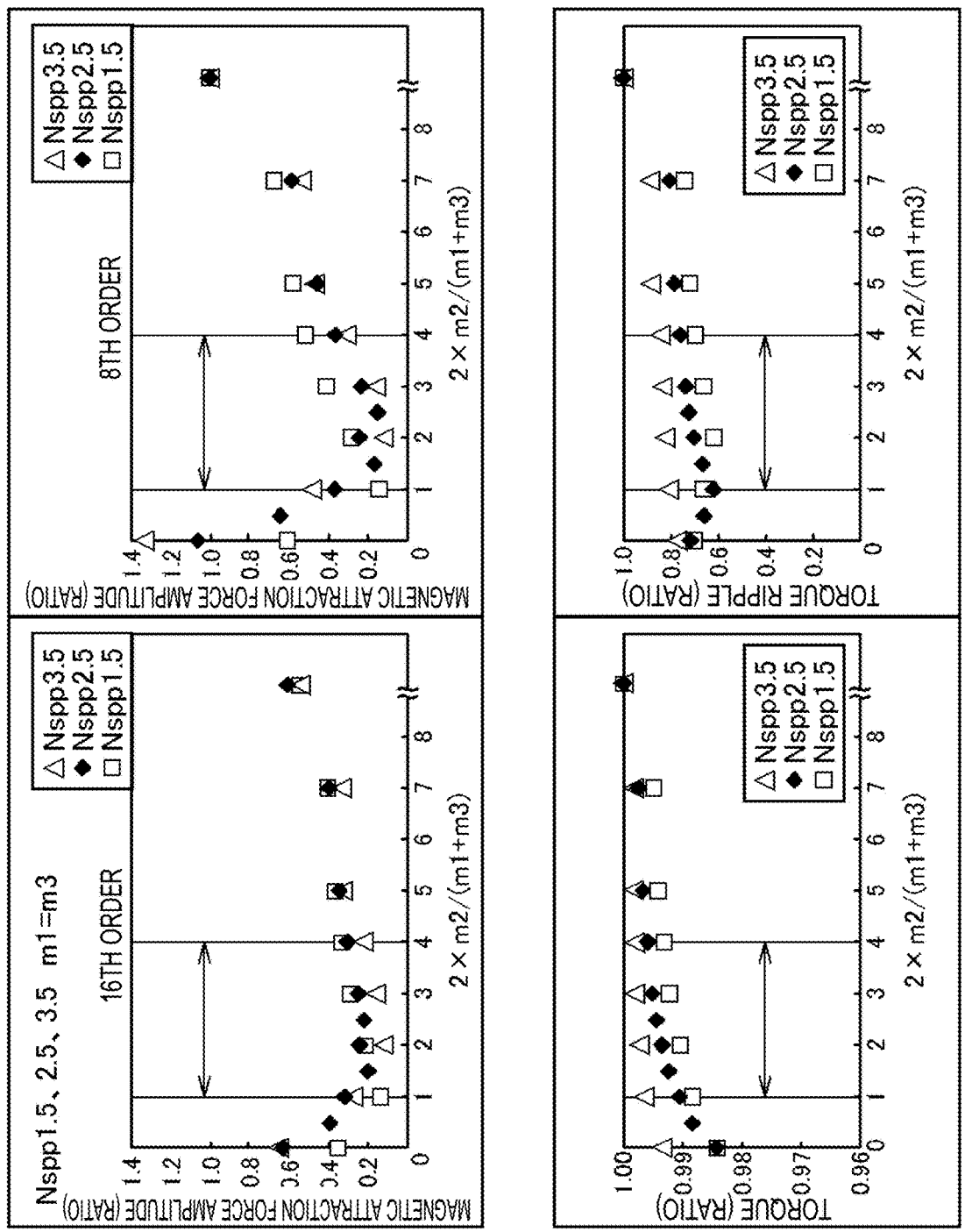
FIG. 21 is a diagram illustrating simulation results of a magnetic attraction force amplitude ratio between a rotor and a stator, torque, and a torque ripple in a rotating electric machine in which Nspp is 1.5, 2.5, and 3.5 (m1=m3)
Figure 24:
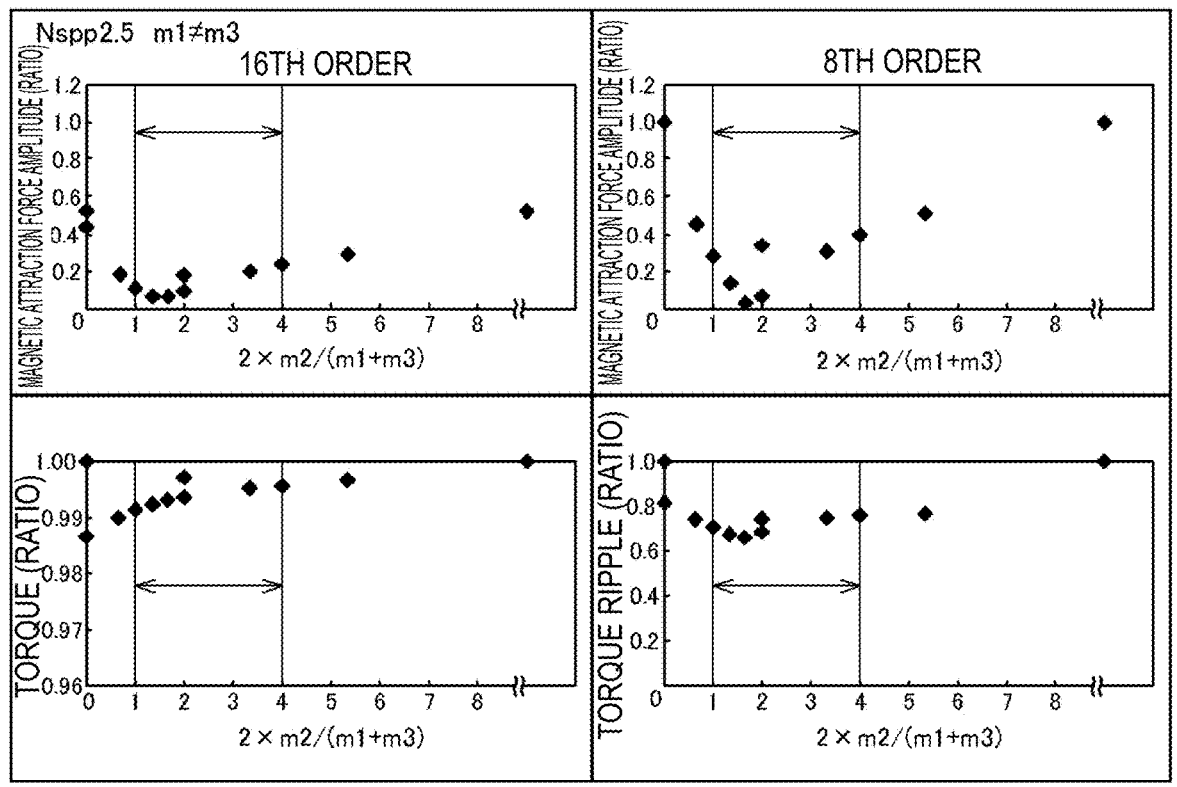
FIG. 24 is a diagram illustrating simulation results of a magnetic attraction force amplitude ratio between the rotor and the stator, torque, and a torque ripple in the rotating electric machine in which Nspp is 2.5 (m1≠m3)

FIGS. 20, 21, and 24 illustrate analysis results in which a transverse axis expresses the ratio 2×m2/(m1+m3), and a longitudinal axis expresses noise and vibration in a low rotation order, torque, and a torque ripple in the motor M having a fraction slot configuration. FIGS. 25 and 26 illustrate analysis results in which a transverse axis expresses the ratio 2×m2/(m1+m3), and a longitudinal axis expresses torque and a torque ripple in the motor M having an integer slot configuration.

As illustrated in FIGS. 20 and 21 (m1=m3), and FIG. 24 (m1≠m3), it can be seen that there is a range of 2×m2/(m1+m3) appropriate to reduce noise and vibration in each low rotation order in the motor M having a fraction slot configuration. Regarding torque, as 2×m2/(m1+m3) increases, that is, a ratio of the number of layers m2 of the second basic phase band group 52 forming a basic phase band configuration of a single phase increases, the torque gradually comes closer to a state of (m1, m2, m3)=(0, 1, 0), and thus it can be easily understood that the torque increases toward a torque ratio of 1. From the above description, a range causing a magnetic attraction force amplitude ratio in a low rotation order and a torque ripple to be reduced while securing desired torque is 1≤2×m2/(m1+m3) 4. Specifically, as illustrated in FIGS. 20 and 21, a torque reduction can be made within about 1%, a magnetic attraction force amplitude ratio in a low rotation order can be reduced to about ⅓ or less, and a torque ripple can be improved by about 20% or more.

Figure 27:
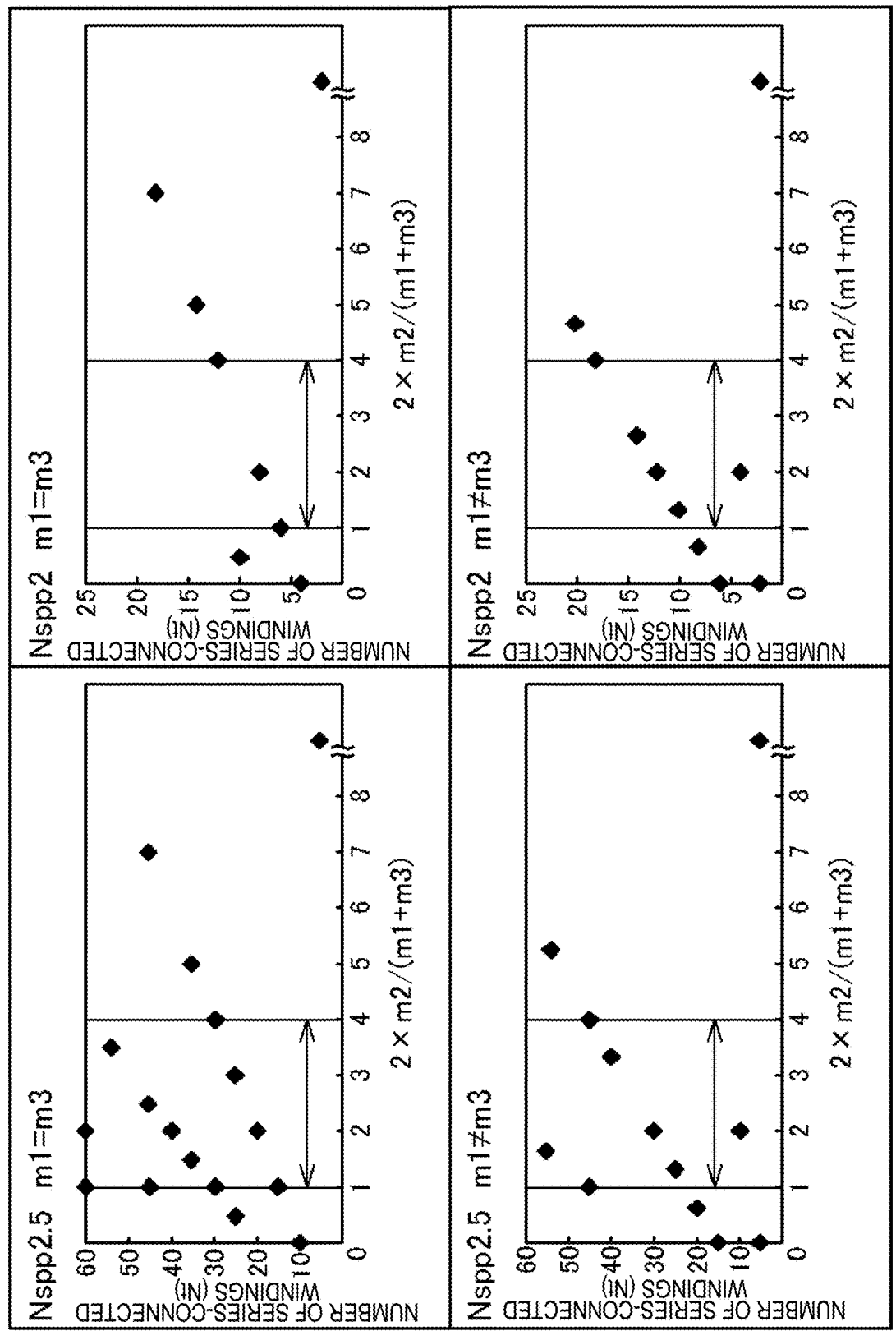
FIG. 27 is a diagram illustrating a relationship between the ratio 2×m2/(m1+m3) and the number of series-connected windings Nt in the present embodiment.

As illustrated in FIGS. 25 and 26, the range of 1≤2×m2/(m1+m3) 4 is also a range causing a torque ripple to be reduced while securing desired torque in the motor M having an integer slot configuration. As mentioned above, in the range of 1≤2×m2/(m1+m3) 4, it is possible to reduce a torque ripple while substantially maintaining desired torque in both of the fraction slot configuration and the integer slot configuration. In the fraction slot configuration, noise and vibration can also be reduced. FIG. 27 illustrates a relationship between the ratio 2×m2/(m1+m3) and the number of series-connected windings Nt causing the performance of the motor M to be improved as described above. As illustrated in FIG. 27, in the present embodiment, since the range of the ratio 2×m2/(m1+m3) is defined, and thus options for m1, m2, and m3 can be increased, it is possible to increase options for the number of phase serial turns in the motor M of which the performance improvement (a reduction of a torque ripple and a reduction of noise and vibration) is realized. Consequently, the number of phase serial turns requested from other requirements (output characteristics, an application voltage, an application current, a motor size, and the like) and the number of phase serial turns causing the performance improvement to be realized can be matched with each other or be set to similar values, and thus it is possible to realize the performance improvement while satisfying the other requirements. On the other hand, unless there are the present findings, options for the number of phase serial turns for realizing the performance improvement are reduced, and thus a difference from the number of phase serial turns requested from the other requirements becomes great, so that a case where only either of the other requirements and the performance improvement is satisfied increases. In this case, for example, when the number of phase serial turns causing the performance improvement to be realized is selected, other requirements are not satisfied, and, as countermeasures therefor, a problem that a size of the motor M is to be increased occurs. When there is a restriction in a size of the motor M, the performance improvement cannot be realized.

Skew Configuration

Figure 28:
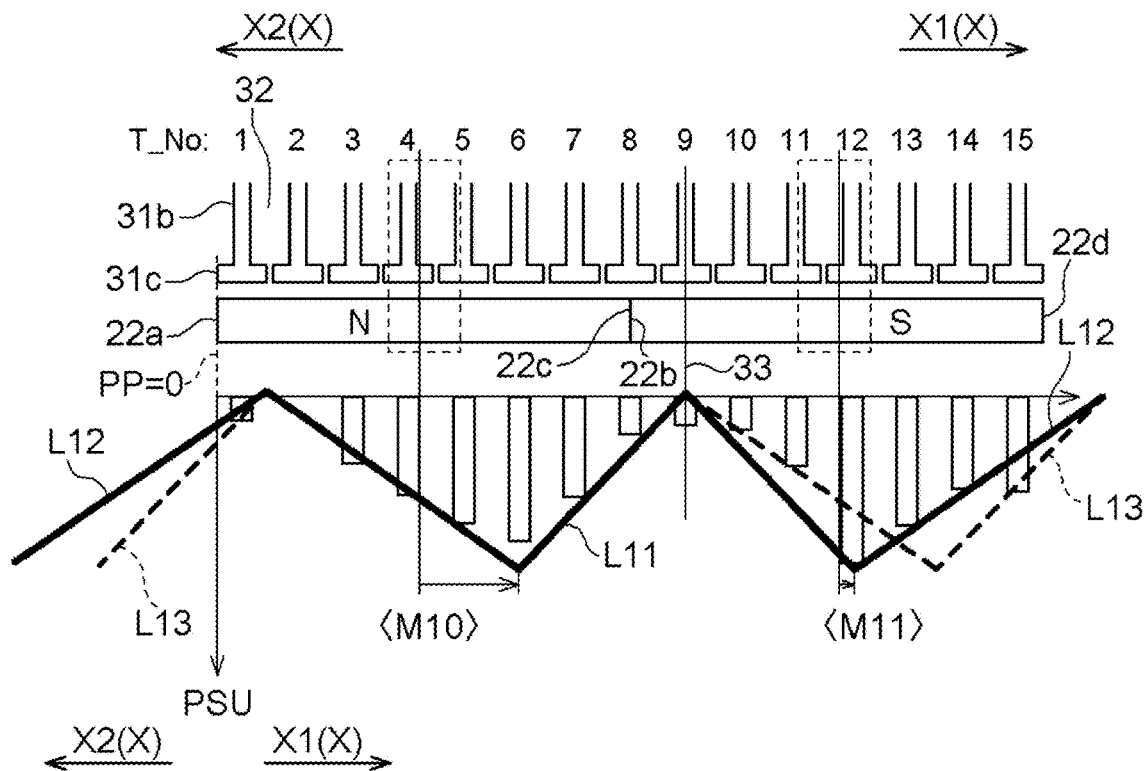
FIG. 28 is a diagram illustrating an electromagnetic attraction force distribution in a comparison example.

FIG. 28 illustrates an example of a magnetic pole facing state between a plurality of teeth portions 31b and a pair of magnetic poles (an N pole and an S pole) of the rotor 2 in the motor M having eight poles and sixty slots in a comparison example in which a skew is not provided. In FIG. 28, the annular stator core 31 is illustrated to be linearly developed, and the stator core 31 is illustrated to be viewed from the axial direction Z. In FIG. 28, the yoke portion 31a and the winding are not illustrated, and each teeth portion 31b is added with an identification number (hereinafter, referred to as a stator magnetic pole number T_No) of a stator magnetic pole formed in the stator core 31. For convenience of description, a central position of the slot 32 between the stator magnetic pole number T_No of 60 and the stator magnetic pole number T_No of 1 is used as a position reference (a position coordinate PP is 0) of the pair of magnetic poles of the rotor 2.

As illustrated in FIG. 28, one end 22a (of which the position coordinate PP is 0) of both ends 22a and 22b of the N pole in the circumferential direction X faces the central position of the slot 32. In contrast, the other end 22b (of which the position coordinate PP is 7.5) of the N pole faces a central position of the teeth portion 31b. Thus, a magnetic pole central position (of which the position coordinate PP is 3.75) is disposed to be deviated relative to the central position (the teeth portion 31b having the stator magnetic pole number T_No of 4) of the teeth portion 31b in the rotational direction X1.

In this case, electromagnetic attraction force distributions (hereinafter, simply referred to as "attraction force distributions") applied to the plurality of teeth portions 31b in the radial direction Y are distributions represented by bar graphs in FIG. 28. FIG. 28 illustrates examples of electromagnetic attraction force distributions applied to the plurality of teeth portions 31b in the radial direction Y in a motor of the comparison example. A longitudinal axis expresses the magnitude PSU of attraction force, and a transverse axis expresses the circumferential direction X. The motor of the comparison example is different from the motor M of the present embodiment in that the rotor 2 does not have a continuous skew part 42 which will be described later.

The attraction force distributions applied to the plurality of teeth portions 31b may be acquired through magnetic field analysis. A solid line L11 indicates an approximate straight line obtained by approximating the attraction force distributions represented by the bar graphs with a straight line. As illustrated in FIG. 28, a peak value of the attraction force distributions of the stator magnetic pole is deviated in the rotational direction X1 relative to the central position of the rotor N pole. A magnetic pole facing state in which the attraction force distributions are generated will be referred to as a magnetic pole facing state M10.

One end 22c (of which the position coordinate PP is 7.5) of both ends 22c and 22d of the S pole in the circumferential direction X faces the central position of the teeth portion 31b. In contrast, the other end 22d (of which the position coordinate PP is 15) of the S pole faces the central position of the slot 32. Thus, a magnetic pole central position (of which the position coordinate PP is 11.25) is disposed to be deviated relative to the central position (the teeth portion 31b having the stator magnetic pole number T_No of 12) of the teeth portion 31b in the reversely rotational direction X2.

In this case, attraction force distributions applied to the plurality of teeth portions 31b are distributions represented by bar graphs in FIG. 28. A solid line L12 indicates an approximate straight line obtained by approximating the attraction force distributions represented by the bar graphs for the respective stator magnetic poles with a straight line. As illustrated in FIG. 28, a peak value of the attraction force distributions of the stator magnetic pole is deviated in the rotational direction X1 relative to the central position of the rotor S pole. A magnetic pole facing state in which the attraction force distributions are generated will be referred to as a magnetic pole facing state M11.

As mentioned above, the ½-sequence (where c=2) motor M has two types of states such as the magnetic pole facing state M10 and the magnetic pole facing state M11, and thus has two types of attraction force distributions. Therefore, a pair of rotor magnetic poles adjacent to each other in the circumferential direction X have different attraction force distributions. As a result, attraction force distributions applied to the plurality of teeth portions 31b are not equivalent per magnetic pole, and are equivalent every pair of magnetic poles (every two magnetic poles), that is, every other pole.

The two types of attraction force distributions (two types of magnetic pole facing state M10 and magnetic pole facing state M11) are substantially symmetric to each other with respect to a mirror plane 33. The mirror plane 33 indicates a virtual reference plane formed in the radial direction Y and the axial direction Z. When the solid line L11 is folded back with respect to the mirror plane 33, the solid line L11 substantially matches the solid line L12. A dashed line L13 in FIG. 28 indicates that the solid line L11 is moved in parallel by one magnetic pole of the rotor 2 in the circumferential direction X. Regions surrounded by dashed lines in FIG. 28 indicate a difference in a magnetic pole facing state between the teeth portions 31b and the pair of magnetic poles.

The two types of attraction force distributions (two types of magnetic pole facing state M10 and magnetic pole facing state M11) have excitation force components in a lower order (the spatial deformation mode fourth order in the present embodiment) than an order (the spatial deformation mode eighth order in the present embodiment) depending on the number of poles (eight poles in the present embodiment) of the rotor 2.

Figure 29:
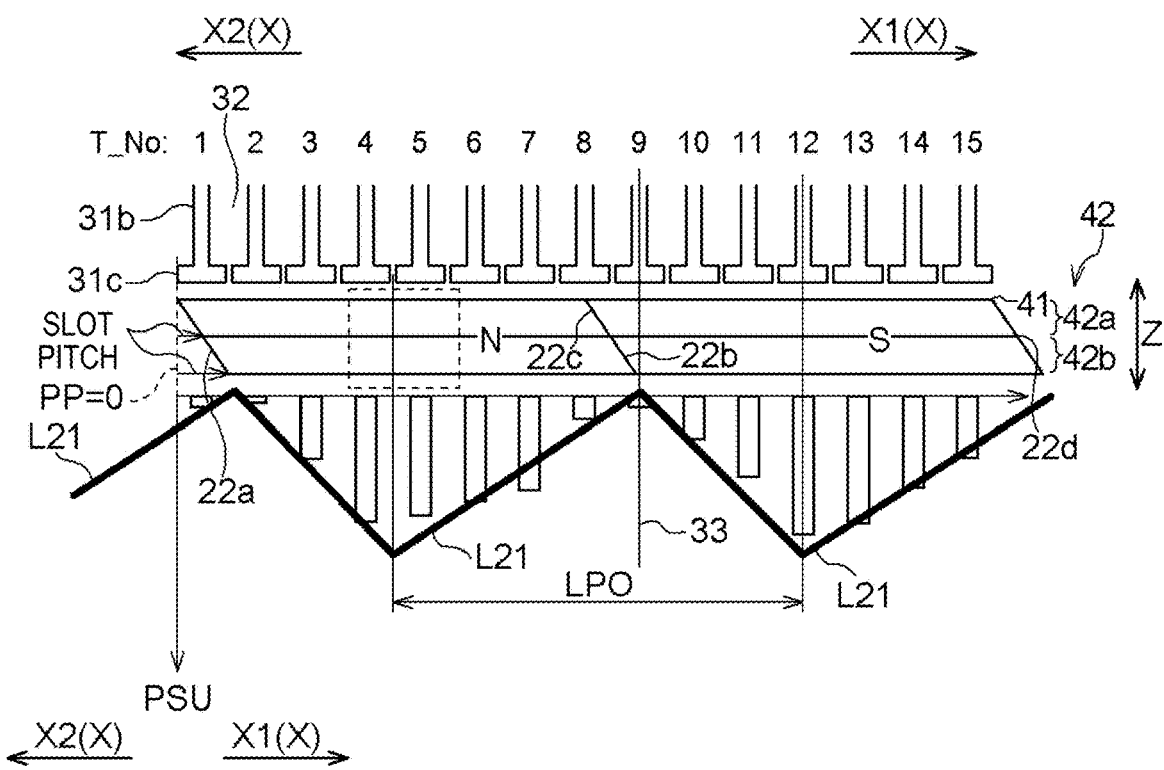
FIG. 29 is a diagram illustrating an electromagnetic attraction force distribution in the present embodiment.

FIG. 29 illustrates examples of magnetic pole facing states between a plurality of teeth portions 31b and a pair of magnetic poles of the rotor 2 in the present embodiment. For convenience of description, FIG. 29 is partially different from FIG. 28 in illustration method. There is a difference in that, in FIG. 29, an illustration method is changed with a gap between the stator 3 and the rotor 2 as a boundary. In FIG. 29, the stator 3 is illustrated to be viewed from the axial direction Z on an upper stage of the boundary, and the rotor 2 is illustrated to be viewed from the radial direction Y on a lower stage of the boundary. This is illustrated for convenience in order to clearly illustrate a positional relationship between a consecutive skew provided on the rotor 2 and the circumferential direction X of the stator 3.

As illustrated in FIG. 29, the rotor 2 of the present embodiment includes a first reference part 41 (an example of a reference part) and the continuous skew part 42 (an example of a skew part). The first reference part 41 is a reference part, and indicates a part used as a reference of a skew. The continuous skew part 42 is a skew part, and indicates a part that is gradually deviated relative to the first reference part 41 in the circumferential direction X and is disposed in the axial direction Z. The continuous skew part 42 is gradually deviated relative to the first reference part 41 in the rotational direction X1 of the circumferential direction X, and is disposed in the axial direction Z.

In FIG. 29, the first reference part 41 and the continuous skew part 42 are illustrated by exemplifying the pair of magnetic poles of the rotor 2, but are formed on the rotor core 21 in the same manner. In other words, a plurality of electromagnetic steel sheets (continuous skew part 42) forming the rotor core 21 are gradually deviated relative to one electromagnetic steel sheet (first reference part 41) forming the rotor core 21 in the rotational direction X1 of the circumferential direction X, and are disposed (stacked) in the axial direction Z.

When the continuous skew part 42 is equally divided into two parts in the circumferential direction X on a plane perpendicular to the axial direction Z, the respective parts will be referred to as a first continuous skew part 42a and a second continuous skew part 42b in this order from the part on the first reference part 41 side. As mentioned above, in FIG. 29, for convenience of description, the continuous skew part 42 is illustrated to be divided into the first continuous skew part 42a and the second continuous skew part 42b, but the continuous skew part 42 is integrally formed. In FIG. 29, the first reference part 41 is an end surface on one end side of the pair of magnetic poles in the axial direction Z. Of both end surfaces of the second continuous skew part 42b in the axial direction Z, an end surface on a side different from the boundary surface between the first continuous skew part 42a and the second continuous skew part 42b is an end surface on the other end side of the pair of magnetic poles in the axial direction Z.

In the continuous skew part 42 of the present embodiment, the maximum value of a skew amount with respect to the first reference part 41 is set such that the maximum value of a relative skew amount between the stator 3 and the rotor 2 is a 1-slot pitch of the stator core 31 in terms of continuous skew. In other words, the rotor 2 has the first reference part 41 and the continuous skew part 42, and the stator 3 does not have the parts. Thus, a skew amount in the stator 3 is 0, and the continuous skew part 42 of the rotor 2 is set such that the maximum value of a skew amount with respect to the first reference part 41 corresponds to one slot pitch.

Specifically, as illustrated in FIG. 29, the pair of magnetic poles at the boundary surface between the first continuous skew part 42a and the second continuous skew part 42b are disposed to be deviated relative to the first reference part 41 by a ½-slot pitch in the rotational direction X1 of the circumferential direction X. The end surface on the other end side of the pair of magnetic poles in the axial direction Z is disposed to be deviated relative to the first reference part 41 by a 1-slot pitch in the rotational direction X1 of the circumferential direction X. The motor M of the present embodiment is the motor M having a configuration of eight poles and sixty slots, and the 1-slot pitch corresponds to an electrical angle of 240° (360°/15 slots).

Of both of the ends 22a and 22b of the N pole of the first reference part 41 in the circumferential direction X, one end 22a (of which the position coordinate PP is 0) faces the central position of the slot 32. The other end 22b (of which the position coordinate PP is 7.5) of the N pole of the first reference part 41 faces the central position of the teeth portion 31b. In this case, the central position (of which the position coordinate PP is 3.75) of the N pole of the first reference part 41 is disposed to be deviated relative to the central position of the teeth portion 31b (the teeth portion 31b having the stator magnetic pole number T_No of 4) in the rotational direction X1.

Of both of the ends 22a and 22b of the N pole in the circumferential direction X at the boundary surface between the first continuous skew part 42a and the second continuous skew part 42b, one end 22a (of which the position coordinate PP is 0.5) faces the central position of the teeth portion 31b. The other end 22b (of which the position coordinate PP is 8) of the N pole faces the central position of the slot 32. In this case, the central position (of which the position coordinate PP is 4.25) of the N pole is disposed to be deviated relative to the central position of the teeth portion 31b (the teeth portion 31b having the stator magnetic pole number T_No of 5) in the reversely rotational direction X2 of the circumferential direction X.

Parts separated from each other by a 1/c-slot pitch (a ½-slot pitch in the present embodiment) in the circumferential direction X, represented by using the denominator c of the number of slots per pole per phase Nspp will be referred to as separation parts. In other words, the part indicated by the position coordinate PP=3.75 and the part indicated by the position coordinate PP=4.25 are separation parts. The described contents regarding the separation parts indicated by the position coordinate PP=3.75 and the position coordinate PP=4.25 are the same for other separation parts in the axial direction Z.

Figure 30:
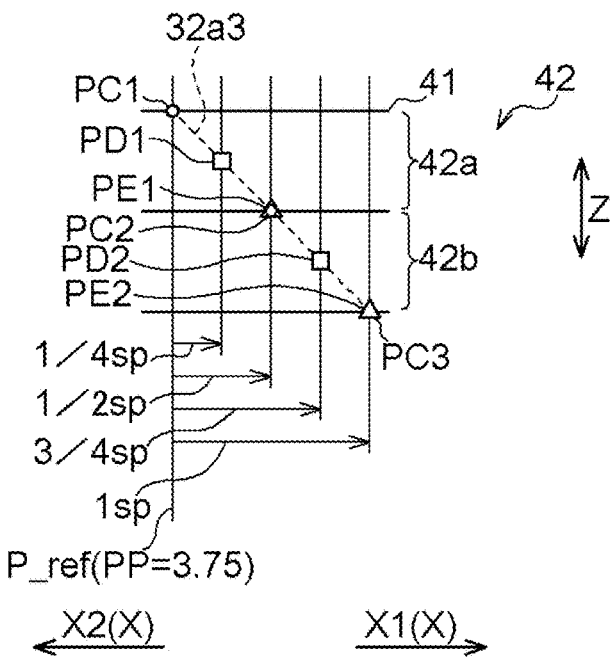
FIG. 30 is a schematic diagram for describing consecutive skews in the present embodiment.

FIG. 30 is a schematic diagram for describing a magnetic pole facing state of a region surrounded by the dashed line in FIG. 29. Circular marks in FIG. 30 indicate separation parts indicated by a position PC1 (position coordinate PP=3.75) and a position PC2 (position coordinate PP=4.25). Square marks indicate separation parts indicated by a position PD1 (position coordinate PP=4) and a position PD2 (position coordinate PP=4.5). Triangular marks indicate separation parts indicated by a position PE1 (position coordinate PP=4.25) and a position PE2 (position coordinate PP=4.75). As illustrated in FIG. 30, the separation parts are located on a dashed line indicating the central position of the N pole. The described contents regarding the separation parts indicated by the position PC1 (position coordinate PP=3.75) and the position PC2 (position coordinate PP=4.25) may also be applied to all separation parts.

The described contents may also be applied to separation parts other than the illustrated separation parts. In other words, the same relationship (a relationship between separation parts separated from each other in the circumferential direction X by a ½-slot pitch) as the above-described relationship is established over the whole rotor 2 in the axial direction Z. The magnetic pole facing state illustrated in FIG. 30 is repeated in the 1-slot pitch unit in the circumferential direction X due to movement (the central position of the magnetic pole of the rotor 2 is moved by an integer multiple of the 1-slot pitch) of the rotor 2.

Between separation parts (in the example illustrated in FIG. 30, between the circular parts, between the square parts, and between the triangular parts), excitation force components in a lower order (the spatial deformation mode fourth order in the present embodiment) are spatially deviated by a half waveform in the axial direction Z to be superimposed on each other, compared with an order (the spatial deformation mode eighth order in the present embodiment) depending on the number of magnetic poles (eight poles in the present embodiment) of the rotor 2, the uniformity per rotor pole is improved, and an attraction force distribution is the same as the number of rotor magnetic poles and is thus made higher order to the same extent (spatial deformation mode eighth order) as the motor M having an integer slot configuration. Therefore, a rotation frequency matching an eigenfrequency of the stator core 31 can be increased to be set outside a usage rotation frequency range, for example. In other words, the motor M of the present embodiment can avoid a resonance chance of the stator 3 and thus reduce noise and vibration of the motor M within the usage rotation frequency range.

When the maximum value of a skew amount with respect to the first reference part 41 is not set to a 1-slot pitch, a region where the above-described relationship (the relationship between separation parts separated from each other by a ½-slot pitch in the circumferential direction X) is not established is generated. As a result, an excitation force component in a low order (the spatial deformation mode fourth order in the present embodiment) remains in the region, and thus it is difficult to mix, average, and uniformize the attraction force distributions over the whole rotor 2 in the axial direction Z.

FIG. 29 illustrates examples of electromagnetic attraction force distributions applied to the plurality of teeth portions 31b in the radial direction Y, acquired through magnetic field analysis. A longitudinal axis expresses the magnitude PSU of attraction force, and a transverse axis expresses the circumferential direction X. A solid line L21 indicates an approximate straight line obtained by approximating the attraction force distributions represented by the bar graphs with a straight line. FIG. 29 illustrates that an attraction force distribution comes close to an attraction force distribution (an attraction force distribution in an integer slot configuration) in which a peak value of attraction force is equivalent per pole by mixing, averaging, and uniformizing the attraction force distributions described above. An attraction force pitch LPO indicates an interval between peak values of attraction force in the circumferential direction X. The attraction force pitch LPO is a 7.5-slot pitch to be uniform per pole, and matches a rotor magnetic pole pitch (7.5-slot pitch).

The continuous skew part 42 is preferably set such that an increase ratio or a decrease ratio of a skew amount with respect to the first reference part 41 is constant from one end side to the other end side in the axial direction Z. When the continuous skew part 42 is deviated relative to the first reference part 41 in the rotational direction X1, a skew amount of the continuous skew part 42 is assumed to increase. Conversely, when the continuous skew part 42 is deviated relative to the first reference part 41 in the reversely rotational direction X2, a skew amount of the continuous skew part 42 is assumed to decrease.

As illustrated in FIG. 30, according to the motor M of the present embodiment, the continuous skew part 42 is formed such that an increase ratio of a skew amount with respect to the first reference part 41 is set to be constant from one end side to the other end side in the axial direction Z. For example, a skew increase amount with respect to the position PC1 (position coordinate PP=3.75) is a ½-slot pitch between the position PC1 (position coordinate PP=3.75) and the position PC2 (position coordinate PP=4.25). A skew increase amount with respect to the position PC2 (position coordinate PP=4.25) is a ½-slot pitch between the position PC2 (position coordinate PP=4.25) and the position PC3 (position coordinate PP=4.75). As mentioned above, a skew amount uniformly increases at a constant ratio from position PC1 (position coordinate PP=3.75) to the position PC3 (position coordinate PP=4.75).

As mentioned above, since the continuous skew part 42 is formed such that an increase ratio of a skew amount with respect to the first reference part 41 is set to be constant from one end side to the other end side in the axial direction Z, leakage magnetic flux in the axial direction Z can be reduced compared with a case where a skew amount with respect to the first reference part 41 discontinuously changes. As a result, it is possible to simplify a rotor structure or a manufacturing process. The described contents may also be applied to a case where a decrease ratio of a skew amount with respect to the first reference part 41 is set to be constant. In this case, the continuous skew part 42 is gradually deviated relative to the first reference part 41 in the reversely rotational direction X2 of the circumferential direction X, and is disposed in the axial direction Z.

As mentioned above, the continuous skew part 42 in the present embodiment is gradually deviated relative to the first reference part 41 in the circumferential direction X and is disposed in the axial direction Z. The continuous skew part 42 is formed such that the maximum value of a skew amount with respect to the first reference part 41 is set to a 1-slot pitch. Thus, any positional part of the rotor 2 in the circumferential direction X spreads with a width of the 1-slot pitch in the circumferential direction X, and faces the stator 3, and thus magnetic fluctuation in the opening of the slot 32 of the stator 3 gradually changes such that a torque ripple is reduced.

In the motor M having a fraction slot configuration, different magnetic pole facing states are repeated in the circumferential direction X, and thus a torque ripple originally tends to decrease compared with a rotating electric machine having an integer slot configuration. According to the motor M of the present embodiment, the rotor 2 has the continuous skew part 42, and thus a torque ripple caused by a magnetic pole facing state between the stator magnetic pole and the rotor magnetic pole is further reduced. According to the motor M of the present embodiment, the rotor 2 has the continuous skew part 42, and thus a steep change of magnetic flux is suppressed such that it is possible to reduce an iron loss, to reduce a magnet eddy loss, and to reduce a copper eddy loss.

As disclosed in Reference 3, in order to reduce harmonic components, a continuous skew (the maximum value of a skew amount with respect to the first reference part 41 is set to a 1/c-slot pitch) corresponding to a 1/c-slot pitch (where c is a denominator of the number of slots per pole per phase) of the stator 3 or a step skew (a deviation amount in the circumferential direction is a 1/(2×c)-slot pitch) as a simple version corresponding thereto may be formed. The same effect may also be achieved by a continuous skew corresponding to an nq/c-slot pitch (where nq is a natural number) of the stator 3. However, as the natural number nq increases, a torque reduction of the motor M increases. Manufacturing tends to be complicated. Thus, typically, 1 is selected as the natural number nq. However, this cannot improve magnetic cyclic deterioration between the rotor 2 and the stator 3, and thus noise and vibration in a spatial deformation mode in a lower order than the number of rotor magnetic poles cannot be reduced. On the other hand, according to the present embodiment, in the motor M having a fraction slot configuration, in the continuous skew part 42, the maximum value (in the present embodiment, a 1-slot pitch, that is, nq=c=2) of a skew amount with respect to the first reference part 41 is set such that the maximum value of a relative skew amount between the stator 3 and the rotor 2 is a 1-slot pitch of the stator core 31 in terms of continuous skew. In other words, 2 is selected as the natural number nq. Consequently, reduction of noise and vibration of the motor M is realized for the first time, and harmonic components included in a torque ripple or an output waveform can be reduced.

As a method for reducing noise, vibration, and a torque ripple of the motor M, there may be a method in which a cutout is provided at each teeth front end of the stator core 31 or a surface (outer surface) of the rotor core 21 facing each teeth front end. However, in this method, a gap is substantially enlarged, and thus a torque reduction increases compared with the skew. The motor M of the present embodiment can suppress a torque reduction, and also reduce noise, vibration, and a torque ripple of the motor M.

Although not illustrated, as a modification example, the stator 3 may have the first reference part 41 and the continuous skew part 42. Specifically, a plurality of electromagnetic steel sheets (continuous skew part 42) forming the stator core 31 are gradually deviated relative to one electromagnetic steel sheet (first reference part 41) forming the stator core 31 in the reversely rotational direction X2 of the circumferential direction X, and are disposed (stacked) in the axial direction Z.

Although not illustrated, as another modification example, both of the stator 3 and the rotor 2 may have the first reference part 41 and the continuous skew part 42. Specifically, the stator 3 has the first reference part 41 and the continuous skew part 42 that is deviated relative to the first reference part 41 in the rotational direction X1, and the continuous skew part 42 is formed such that the maximum value of a skew amount with respect to the first reference part 41 is set to a ½-slot pitch. The rotor 2 has the first reference part 41 and the continuous skew part 42 that is deviated relative to the first reference part 41 in the reversely rotational direction X2, and the continuous skew part 42 is formed such that the maximum value of a skew amount with respect to the first reference part 41 is set to a ½-slot pitch. Consequently, the maximum value of a relative skew amount between the stator 3 and the rotor 2 is a 1-slot pitch of the stator core 31 in terms of continuous skew.

The motor M of the present modification example can reduce a skew amount of the stator 3 and the rotor 2 compared with a skew amount when a skew is formed in only one of the stator 3 and the rotor 2. As a result, it is possible to reduce leakage magnetic flux and thus to suppress a torque reduction.

According to the motor M of the present modification example, the maximum value of a skew amount in the continuous skew part 42 of the stator 3 and the maximum value of a skew amount in the continuous skew part 42 of the rotor 2 are set to the same value (½-slot pitch). Consequently, in the motor M of the present modification example, a skew amount is uniformly shared by and distributed to both of the stator 3 and the rotor 2, and thus the complexity of manufacturing of the stator 3 and the rotor 2 accompanied by the skew can be apportioned such that the workability in a manufacturing process can be improved.

Another Embodiment 1

Another Embodiment 1 is different from the above-described embodiment in that the first reference part 41 has a first reference part 41a (an example of a reference part) on one end side in the axial direction Z and a first reference part 41b (an example of a reference part) on the other end side in the axial direction Z, and the continuous skew part 42 has a continuous skew part 45a (an example of a skew part) on one end side and a continuous skew part 45b (an example of a skew part) on the other end side.

Figure 31:
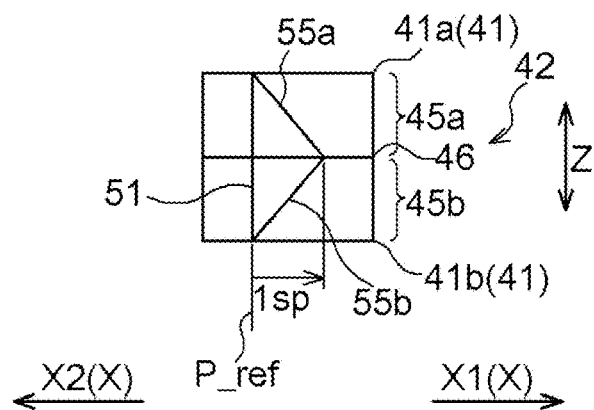
FIG. 31 is a schematic diagram for describing a V skew in Another Embodiment 1.

FIG. 31 illustrates an example of a skew state of the stator 3 when viewed from the radial direction Y. In the present embodiment, a skew amount in the rotor 2 is 0. Thus, a skew position of the stator 3 is formed along the axial direction Z. A straight line 51 indicates a skew position of the stator 3 at a reference position P_ref, and one end side in the axial direction Z and the other end side in the axial direction Z are aligned in the circumferential direction X.

A description will be made of an example of a skew in the rotor 2 with reference to FIG. 31. In this case, a skew amount in the stator 3 is zero. In the present embodiment, the rotor 2 also has the first reference part 41 and the continuous skew part 42. However, in the present embodiment, the first reference part 41 includes the first reference part 41a on one end side and the first reference part 41b on the other end side.

The continuous skew part 42 includes the continuous skew part 45a on one end side and the continuous skew part 45b on the other end side. The continuous skew part 45a on one end side indicates a part of which a half on one end side in the axial direction Z is gradually deviated relative to the first reference part 41a on one end side in the rotational direction X1 and which is disposed up to a central portion 46 in the axial direction Z. The continuous skew part 45b on the other end side indicates a part of which a half on the other end side in the axial direction Z is gradually deviated relative to the central portion 46 in the reversely rotational direction X2 of the circumferential direction X and which is disposed up to the first reference part 41b on the other end side in the reversely rotational direction X2. In the present embodiment, the reference position P_ref of the stator 3 and the reference position P_ref of the rotor 2 (a reference position of the first reference part 41a on one end side and a reference position of the first reference part 41b on the other end side) match each other.

The continuous skew part 45a on one end side is formed such that the maximum value of a skew amount with respect to the first reference part 41a on one end side is set to a 1-slot pitch. A straight line 55a indicates a skew position of the rotor 2, and the reference position P_ref of one end side in the axial direction Z is coupled to the position separated from the reference position P_ref of the central portion 46 in the axial direction Z by a 1-slot pitch. Similarly, the continuous skew part 45b on the other end side is formed such that the maximum value of a skew amount with respect to the first reference part 41b on the other end side is set to a 1-slot pitch. A straight line 55b indicates a skew position of the rotor 2, and the position separated from the reference position P_ref of the central portion 46 in the axial direction Z by a 1-slot pitch is coupled to the reference position P_ref of the other end side in the axial direction Z. Consequently, a relative skew amount between the stator 3 and the rotor 2 is the maximum at the central portion 46 of the stator 3 and the rotor 2 in the axial direction Z, and the maximum value of the relative skew amount between the stator 3 and the rotor 2 is a 1-slot pitch of the stator core 31 in terms of continuous skew.

According to the motor M of the present embodiment, the rotor 2 has the first reference part 41 and the continuous skew part 42. The first reference part 41 includes the first reference part 41a on one end side and the first reference part 41b on the other end side. The continuous skew part 42 includes the continuous skew part 45a on one end side and the continuous skew part 45b on the other end side. The first reference part 41 and the central portion 46 in the axial direction Z are set such that the maximum value of a relative skew amount between the stator 3 and the rotor 2 is a 1-slot pitch of the stator core 31 in terms of continuous skew. Therefore, the motor M of the present embodiment can achieve the same advantageous effect as the advantageous effect in the above-described embodiment.

Preferably, the continuous skew part 45a on one end side is formed such that an increase ratio of a skew amount with respect to the first reference part 41a on one end side is set to be constant from one end side in the axial direction Z to the central portion 46, and the continuous skew part 45b on the other end side is formed such that a decrease ratio of a skew amount with respect to the first reference part 41b on the other end side is set to be constant from the central portion 46 in the axial direction Z to the other end side. An absolute value of an increase ratio of a skew amount and an absolute value of a decrease ratio of a skew amount are preferably set to the same value. Consequently, leakage magnetic flux can be reduced compared with a case where a skew amount with respect to the first reference part 41 (the first reference part 41a on one end side and the first reference part 41b on the other end side) discontinuously changes. It is possible to simplify a manufacturing process.

Since the continuous skew part 42 of the present embodiment has the continuous skew part 45a on one end side and the continuous skew part 45b on the other end side, reflection symmetry with respect to the central portion 46 in the axial direction Z is secured, and thus torsional resonance can be reduced. When the permanent magnet 22 is a sintered magnet, workability when the permanent magnet 22 is attached to a magnet storage portion of the rotor core 21 may deteriorate. In this case, the permanent magnet 22 may be equally divided into two magnets in the circumferential direction X on a plane perpendicular to the axial direction Z. One of the divided permanent magnets 22 is attached from one end side in the axial direction Z, and the other of the divided permanent magnets 22 is attached from the other end side in the axial direction Z, so that the deterioration in the workability can be reduced.

In the present embodiment, a distance between the separation parts (the parts separated from each other by a ½-slot pitch in the circumferential direction X) in the axial direction Z in the above-described embodiment is reduced to about a half. Therefore, in the present embodiment, a higher order of an attraction force distribution is realized in a shorter distance, and thus the present embodiment is more useful. The present embodiment is also useful when axial lengths (dimensions in the axial direction Z) of the stator 3 and the rotor 2 are increased. The configuration of the present embodiment may be repeatedly used in the axial direction Z. In the continuous skew part 42, the number of parts gradually deviated in the rotational direction X1 may not be the same as the number of parts gradually deviated in the reversely rotational direction X2 of the circumferential direction X. These may be selected as appropriate according to a size, a requirement specification, or the like of the motor M.

Still Another Embodiment 2

Still Another Embodiment 2 is different from the above-described embodiment in that the stator 3 has the first reference part 41 (an example of a reference part) and the continuous skew part 42, and the rotor 2 has a second reference part 43 (an example of a reference part) and a step skew part 44 (an example of a skew part).

Figure 32:
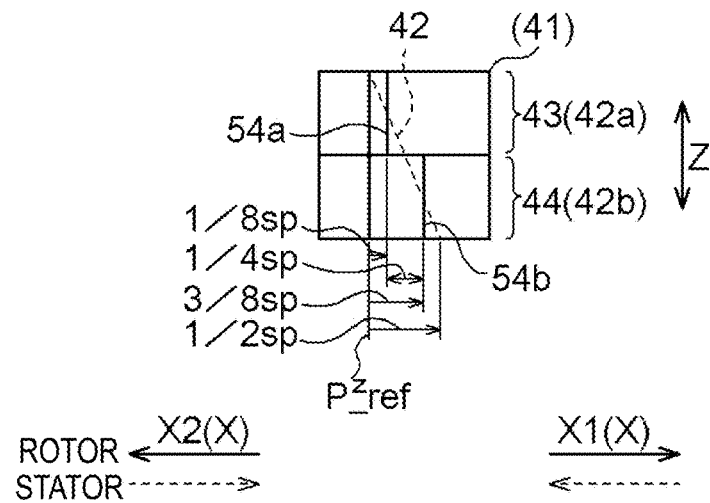
FIG. 32 is a schematic diagram for describing a step skew in Still Another Embodiment 2.

FIG. 32 illustrates states of skews of the stator 3 and the rotor 2. Here, the rotor 2 is of an inner rotor type of being located on an inner circumferential side of the stator 3, and a state of a skew of the stator 3 is illustrated when viewed from the inner circumference of the stator 3, and a state of a skew of the rotor 2 is illustrated when viewed from the outer circumference of the rotor 2. Therefore, the deviation direction X1 or X2 of the skew of the stator 3 is reverse to a deviation direction of the skew of the rotor 2. In order to express the contents, the relation with the stator 3 is indicated by a dashed line in FIG. 32, and the relation with the rotor 2 is indicated by a solid line. The dashed line indicates an example of a state of the skew of the stator 3. In the present embodiment, the stator 3 has the first reference part 41 and the continuous skew part 42. Thus, a skew position of the stator 3 is displaced according to a skew amount from one end side toward the other end side in the axial direction Z. The continuous skew part 42 is gradually deviated relative to the first reference part 41 in the reversely rotational direction X2 of the circumferential direction X, and is disposed in the axial direction Z. The maximum value of a skew amount with respect to the first reference part 41 is set to a ½-slot pitch.

The solid line in FIG. 32 indicates an example of a state of the skew of the rotor 2. In the present embodiment, the rotor 2 has the second reference part 43 and the step skew part 44. The second reference part 43 is a reference part, and indicates a part used as a reference of a skew. The step skew part 44 is a skew part, and indicates a part that is deviated stepwise relative to the second reference part 43 in the circumferential direction X, and is disposed in the axial direction Z. The step skew part 44 is deviated stepwise (one step) relative to the second reference part 43 in the rotational direction X1 of the circumferential direction X, and is disposed in the axial direction Z. As mentioned above, the reference part includes the first reference part 41 and the second reference part 43, and the skew part includes the continuous skew part 42 and the step skew part 44. The reference position P_ref (a reference position of the first reference part 41) of the stator 3 matches the reference position P_ref (a reference position of the second reference part 43) of the rotor 2.

A skew amount of the step skew part 44 with respect to the second reference part 43 is set to a half of the maximum value of a skew amount of the continuous skew part 42 with respect to the first reference part 41. As described above, in the present embodiment, the maximum value of a skew amount of the continuous skew part 42 of the stator 3 with respect to the first reference part 41 is set to a ½-slot pitch. Thus, a skew amount of the step skew part 44 of the rotor 2 with respect to the second reference part 43 is a ¼-slot pitch. Consequently, a relative skew amount between the stator 3 and the rotor 2 is the maximum on the other end sides of the stator 3 and the rotor 2 in the axial direction Z, and the maximum value of the relative skew amount between the stator 3 and the rotor 2 is a 1-slot pitch of the stator core 31 in terms of continuous skew.

FIG. 32 illustrates a method of converting skew amounts of the continuous skew part 42 and the step skew part 44. The continuous skew part 42 of the stator 3 is gradually deviated relative to the first reference part 41 in the reversely rotational direction X2 of the circumferential direction X, and is disposed in the axial direction Z. The maximum value of a skew amount with respect to the first reference part 41 in this case is set to a ½-slot pitch. As illustrated in FIG. 32, a central position 54a of the continuous skew in the first continuous skew part 42a (corresponding to the second reference part 43 of the step skew) corresponds to a position moved by a ⅛-slot pitch from the reference position P_ref in the rotational direction X1 of the circumferential direction X. A central position 54b of the continuous skew in the second continuous skew part 42b (corresponding to the step skew part 44 of the step skew) corresponds to a position moved by a ⅜-slot pitch from the reference position P_ref in the rotational direction X1 of the circumferential direction X.

A difference (¼-slot pitch) between the central position 54a of the first continuous skew part 42a and the central position 54b of the second continuous skew part 42b is a skew amount of the step skew part 44 with respect to the second reference part 43. When the central position 54a of the first continuous skew part 42a is moved in the reversely rotational direction X2 of the circumferential direction X by a ⅛-slot pitch, the central position 54a matches the reference position P_ref. When the central position 54b of the second continuous skew part 42b is moved in the reversely rotational direction X2 of the circumferential direction X by a ⅛-slot pitch, the central position 54b matches the central position of the continuous skew part 42.

According to the motor M of the present embodiment, the stator 3 has the first reference part 41 and the continuous skew part 42, and the rotor 2 has the second reference part 43 and the step skew part 44. A skew amount of the step skew part 44 with respect to the second reference part 43 is set to a half (a ¼-slot pitch in the present embodiment) of the maximum value of a skew amount of the continuous skew part 42 with respect to the first reference part 41. Consequently, complexity of manufacturing of the stator 3 and the rotor 2 due to the skew can be reduced, and thus it is possible to improve the workability in a manufacturing process. Specifically, taking into consideration the workability when windings are assembled to a plurality of slots 32 of the stator core 31, the stator 3 may have the continuous skew part 42 compared with the step skew part 44. On the other hand, when the permanent magnet 22 is a sintered magnet, taking into consideration the workability when the permanent magnet 22 is attached to a magnet storage portion of the rotor core 21, the rotor 2 may have the step skew part 44 compared with the continuous skew part 42. With the configuration, it is possible to improve the workability in a manufacturing process in both of the stator 3 and the rotor 2.

The continuous skew part 42 of the stator 3 may be gradually deviated relative to the first reference part 41 in the rotational direction X1 of the circumferential direction X, and may be disposed in the axial direction Z. In this case, preferably, the step skew part 44 of the rotor 2 is deviated relative to the second reference part 43 stepwise (one step) in the reversely rotational direction X2 of the circumferential direction X, and is disposed in the axial direction Z. In other words, preferably, when the continuous skew part 42 of the stator 3 is deviated relative to the first reference part 41 in the rotational direction X1 of the circumferential direction X, the step skew part 44 of the rotor 2 is deviated relative to the second reference part 43 in the reversely rotational direction X2 of the circumferential direction X. Consequently, it is possible to achieve the same advantageous effect as the advantageous effect described in the second modification example.

The step skew part 44 may be deviated relative to the second reference part 43 stepwise (a plurality of steps) in the circumferential direction X, and may be disposed in the axial direction Z. Also in this case, in the same manner as the case of one step illustrated in FIG. 32, each central position of a continuous skew may be matched with each central position of a step skew such that a skew amount of each step of the step skew part 44 with respect to the second reference part 43 is converted.

As described above, the three types of basic phase band groups 51, 52, and 53 respectively deviated by a predetermined number of slots are provided, and a ratio among the m1, m2, and m3 is optimized. Therefore, in the motor M having a fraction slot configuration, it is possible to reduce noise and vibration caused by excitation force in a low rotation order due to a winding distribution, and, in the motor M having an integer slot configuration, it is possible to reduce a torque ripple due to a winding distribution. Since the maximum value of a skew amount of the continuous skew part 42 with respect to the first reference part 41 is set such that the maximum value of a relative skew amount between the stator 3 and the rotor 2 is a 1-slot pitch of the stator core 31 in terms of continuous skew, it is possible to reduce noise and vibration of the motor M caused by excitation force in a high rotation order due to circumferential-direction magnetic cyclic deterioration in which a facing state between the stator core 31 and the rotor core 21 is reflected. It is also possible to reduce a torque ripple and a harmonic component included in an output waveform along with a reduction of noise and vibration of the motor M. In other words, a winding configuration or a facing state between the stator core 31 and the rotor core 21 is optimized, and thus it is possible to reduce noise and vibration and a torque ripple in all rotation orders.

However, depending on a magnetic saturation state, a shape, or a size of the stator core 31 or the rotor core 21, effects due to the skew and the optimization of the winding configuration may be mixed, or the reduction contribution may differ. However, the combined use of the skew and the optimization of the winding configuration can still reduce noise and vibration in the entire rotation region of the motor M, compared with a case where each thereof is implemented independently. On the other hand, since the combined use of the skew and the optimization of the winding configuration increases a torque reduction compared with a case where each thereof is implemented independently, only an effective countermeasure may be performed when one of the skew and the optimization of the winding configuration can cope with, for example, noise and vibration generated in an operation range of the motor M, and only the noise and vibration may be reduced.

The motor M in the above-described embodiments is not limited to a three-phase AC synchronous electric motor, and may be an AC electric motor, an induction electric motor, or a synchronous electric motor with any number of phases.

The embodiments disclosed here are useful for a rotating electric machine including a stator having a plurality of slots in which coils formed of conductive wires are stored, and a rotor facing the stator and having a plurality of magnetic poles.

A feature of a rotating electric machine according to an aspect of the present disclosure resides in that the rotating electric machine includes a stator having a plurality of slots in which coils formed of conductive wires are stored; and a rotor facing the stator and having a plurality of magnetic poles, in which the rotating electric machine has a fraction slot configuration in which the number of slots per pole per phase obtained by dividing the number of slots of the stator by the number of phases and the number of the magnetic poles of the rotor has a denominator of 2 in simple fraction expression or an integer slot configuration in which the number of slots per pole per phase is a natural number, in which when a set of coil sides of the coils stored in one or the plurality of adjacent slots with the same phase and the same current direction for each of the magnetic poles of the rotor is referred to as a basic phase band, the coils configure a mixed phase band group in which a first basic phase band group obtained by disposing each basic phase band per pole, a second basic phase band group obtained by deviating the first basic phase band group by a predetermined number of slots in a rotational direction of the rotor, and a third basic phase band group obtained by deviating the second basic phase band group in the rotational direction by the predetermined number of slots are stacked in this order in a radial direction of the slots, and in which, in the mixed phase band group, a magnitude of magnetomotive force of each phase per pole is uniform, and, when the number of layers of the first basic phase band group in the radial direction is denoted by m1, the number of layers of the second basic phase band group in the radial direction is denoted by m2, and the number of layers of the third basic phase band group in the radial direction is denoted by m3, a relationship of $0<2\times m2/(m1+m3)$ is satisfied. Here, the predetermined number of slots may be an integer closest to the number of slots per pole obtained by multiplying the number of slots per pole per phase by the number of phases in a case of the fraction slot configuration, and may be 1 in a case of the integer slot configuration.

According to this configuration, since the magnitude of magnetomotive force of each phase per magnetic pole of the rotor is uniform, and the uniformity of a magnetomotive force distribution is improved, excitation force in a spatial deformation mode in a lower order than the number of magnetic poles of the rotor is hardly generated. Therefore, it is possible to reduce noise and vibration caused by a low-order spatial deformation mode of the stator.

The inventor of the present disclosure (hereinafter, referred to as the "present inventor") has repeatedly examined a mixed phase band group capable of reducing noise and vibration caused by a low-order spatial deformation mode of the stator. As a result, as in the present configuration, the present inventor has found that, when the number of layers of the first basic phase band group in the radial direction is denoted by m1, the number of layers of the second basic phase band group in the radial direction is denoted by m2, and the number of layers of the third basic phase band group in the radial direction is denoted by m3, when a relationship of $0<2\times m2/(m1+m3)$ is satisfied, a torque ripple can be reduced while substantially maintaining desired torque in both of the fraction slot configuration and the integer slot configuration, and noise and vibration can be reduced in the fraction slot configuration. In other words, when m2 is provided with respect to m1 or m3, motor performance can be improved, and thus it is also possible to increase options for a configuration regarding the number of turns in the rotating electric machine including the three types of basic phase band groups. As mentioned above, it is possible to easily improve performance only by defining the number of layers such as m1, m2, and m3 in the radial direction even in the fraction slot configuration and the integer slot configuration.

Another feature resides in that a relationship of $1 \leq 2 \times m2/(m1+m3) \leq 4$ is satisfied.

As in this configuration, in a case where the relationship of $1 \leq 2 \times m2/(m1+m3) \leq 4$ is satisfied, it is possible to further reduce noise and vibration or a torque ripple caused by a low-order spatial deformation mode of the stator.

Another feature resides in that a relationship of m1=m3 is satisfied.

As in this configuration, in a case where the relationship of m1=m3 is satisfied, disposition is obtained in which the number of mixed coil sides with the same phase satisfies a concentric winding coil configuration. As a result, coils can be mechanically wound, and thus a coil manufacturing method becomes considerably easy.

Another feature resides in that at least one of the stator and the rotor has a reference part used as a reference of a skew, and a skew part disposed in an orthogonal direction orthogonal to the rotational direction and the radial direction in a state of being deviated relative to the reference part in the rotational direction, and, in the skew part, a maximum value of a skew amount of the skew part with respect to the reference part may be set such that a maximum value of a relative skew amount between the stator and the rotor is a 1-slot pitch of a stator core in terms of continuous skew.

In the present configuration, the maximum value of a skew amount of the skew part with respect to the reference part is set such that the maximum value of a relative skew amount between the stator and the rotor is a 1-slot pitch of a stator core in terms of continuous skew. As a result, it is possible to average an electromagnetic attraction force distribution in the rotational direction, generated between the stator and the rotor, over the whole orthogonal direction, and thus to reduce noise and vibration caused by a low-order spatial deformation mode. Particularly, with the present skew configuration, it is possible to reduce noise and vibration in a low rotation frequency region due to excitation force in a high rotation order of the stator. It is possible to reduce noise and vibration in an intermediate order between a high order and a low order by using both of the configuration of a mixed phase band group and the present skew configuration. As mentioned above, it is possible to reduce noise and vibration in all rotation orders through the combined use of the configuration of a mixed phase band group and the present skew configuration in both of the fraction slot configuration and the integer slot configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotating electric machine comprising:
a stator having a plurality of slots in which coils formed of conductive wires are stored; and
a rotor facing the stator and having a plurality of magnetic poles, wherein
the rotating electric machine has a fraction slot configuration in which a number of slots per pole per phase obtained by dividing the number of slots of the stator by the number of phases and the number of the magnetic poles of the rotor has a denominator of 2 in simple fraction expression or an integer slot configuration in which the number of slots per pole per phase is a natural number,
when a set of coil sides of the coils stored in one or the plurality of adjacent slots with the same phase and the same current direction for each of the magnetic poles of the rotor is referred to as a basic phase band, the coils configure a mixed phase band group in which a first basic phase band group obtained by disposing each basic phase band per pole, a second basic phase band group obtained by deviating the first basic phase band group by a predetermined number of slots in a rotational direction of the rotor, and a third basic phase band group obtained by deviating the second basic phase band group in the rotational direction by the predetermined number of slots are stacked in this order in a radial direction of the slots, and
in the mixed phase band group, a magnitude of magnetomotive force of each phase per pole is uniform, and, when the number of layers of the first basic phase band group in the radial direction is denoted by m1, the number of layers of the second basic phase band group in the radial direction is denoted by m2, and the number of layers of the third basic phase band group in the radial direction is denoted by m3, a relationship of $0 < 2 \times m2/(m1+m3)$ is satisfied.

2. The rotating electric machine according to claim 1, wherein
a relationship of $1 \leq 2 \times m2/(m1+m3) \leq 4$ is satisfied.

3. The rotating electric machine according to claim 2, a relationship of m1=m3 is satisfied.

4. The rotating electric machine according to claim 1, wherein
the predetermined number of slots is an integer closest to the number of slots per pole obtained by multiplying the number of slots per pole per phase by the number of phases in a case of the fraction slot configuration, and is 1 in a case of the integer slot configuration.

5. The rotating electric machine according to claim 1, wherein
at least one of the stator and the rotor has a reference part used as a reference of a skew, and a skew part disposed in an orthogonal direction orthogonal to the rotational direction and the radial direction in a state of being deviated relative to the reference part in the rotational direction, and
in the skew part, a maximum value of a skew amount of the skew part with respect to the reference part is set such that a maximum value of a relative skew amount between the stator and the rotor is a 1-slot pitch of a stator core in terms of continuous skew.

* * * * *